(12) United States Patent
Shimakura

(10) Patent No.: US 7,889,672 B2
(45) Date of Patent: Feb. 15, 2011

(54) COMMUNICATION APPARATUS AND METHOD OF CALCULATING ROUND TRIP TIME

(75) Inventor: Masami Shimakura, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 12/487,533

(22) Filed: Jun. 18, 2009

(65) Prior Publication Data

US 2009/0323543 A1 Dec. 31, 2009

(30) Foreign Application Priority Data

Jun. 30, 2008 (JP) .............................. 2008-171232

(51) Int. Cl.
*H04L 12/26* (2006.01)
(52) U.S. Cl. ..................................... 370/252
(58) Field of Classification Search ................. 370/252, 370/394, 395.5–395.52, 503, 509, 516–520
See application file for complete search history.

(56) References Cited

U.S. PATENT DOCUMENTS

| 7,123,616 B2 * | 10/2006 | Weissberger et al. | ........ 370/389 |
| 7,230,839 B2 | 6/2007 | Lysinger | ..................... 365/49.1 |
| 7,257,087 B2 * | 8/2007 | Grovenburg | ................. 370/248 |
| 2006/0233116 A1 * | 10/2006 | Kyusojin et al. | ............. 370/252 |

FOREIGN PATENT DOCUMENTS

JP 3476985 9/2003

* cited by examiner

*Primary Examiner*—Frank Duong
(74) *Attorney, Agent, or Firm*—Fitzpatrick, Cella, Harper & Scinto

(57) ABSTRACT

A communication apparatus which transmits data to a transmission destination, and receives, from the transmission destination, an acknowledgement indicating that the data has been received stores, in a memory, first specific data for specifying a plurality of transmission data, and transmission time data indicating transmission times of the plurality of transmission data. Based on second specific data contained in the acknowledgement, the communication apparatus searches the memory for first specific data for specifying transmission data corresponding to the acknowledgement, and calculates a round trip time based on the transmission time of the transmission data specified by the found first specific data, and a reception time at which the acknowledgement is received.

7 Claims, 20 Drawing Sheets

FIG. 7

| RID | SOCKET NUMBER | TIME STAMP | SIZE | DEVpre_u_A | DEVpre_u_B | DEVpre_C | RTTpre_u_A | RTTpre_u_B | RTTpre_C | work |
|---|---|---|---|---|---|---|---|---|---|---|
| : | : | : | : | : | : | : | : | : | : | : |
| : | : | : | : | : | : | : | : | : | : | : |
| : | : | : | : | : | : | : | : | : | : | : |
| : | : | : | : | : | : | : | : | : | : | : |
| : | : | : | : | : | : | : | : | : | : | : |

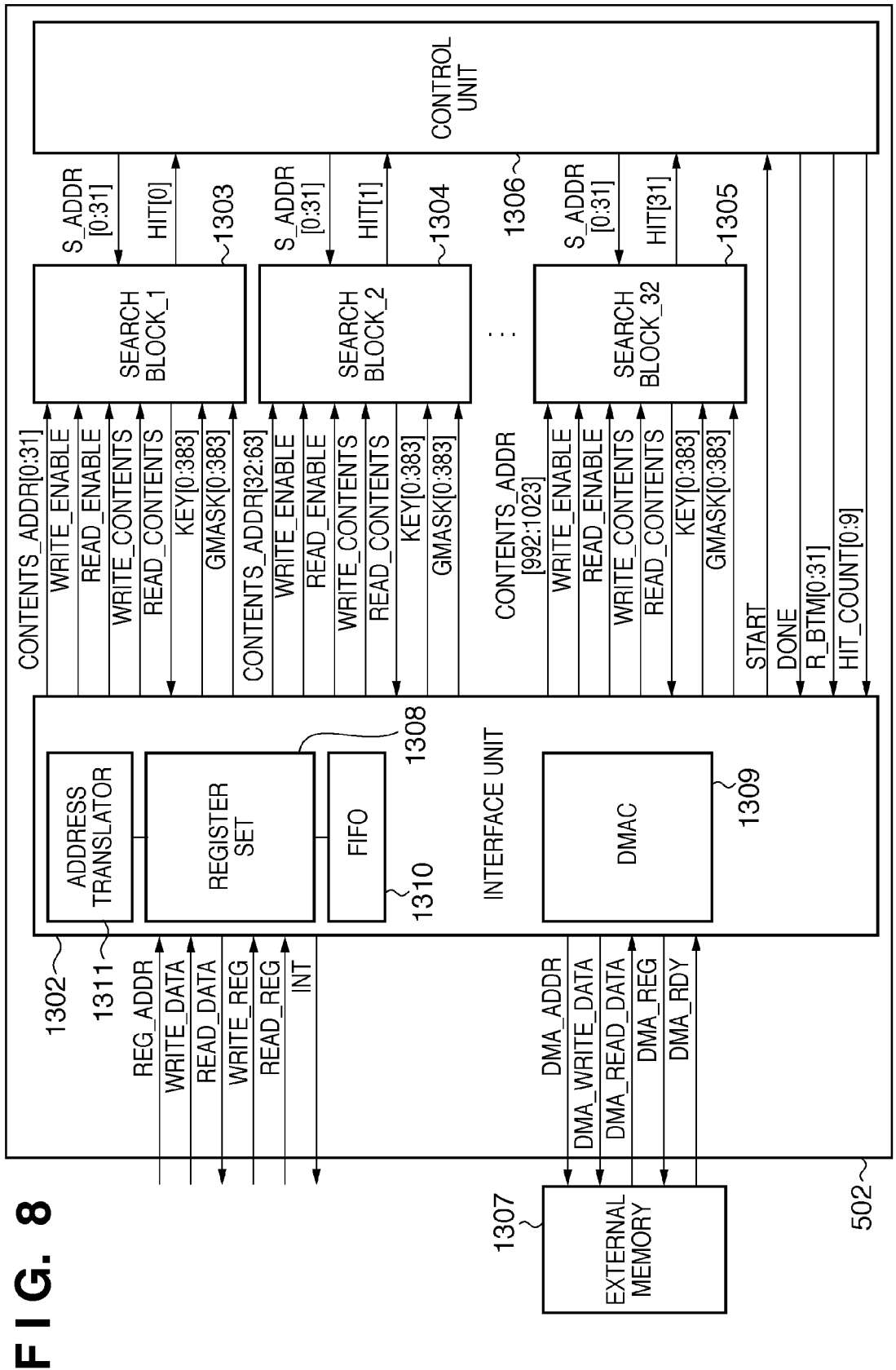

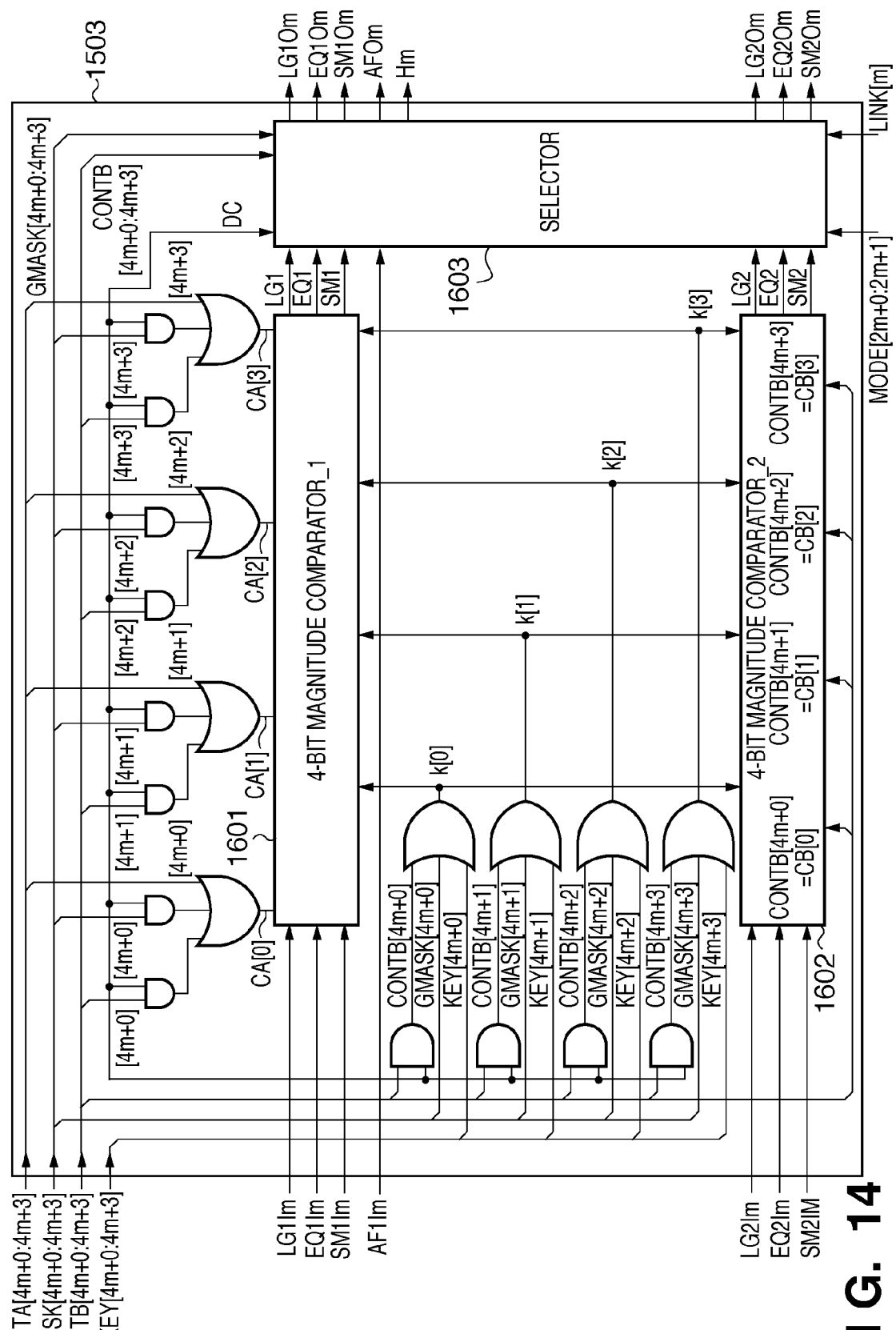
F I G. 14

FIG. 15

| INPUT | | | | | | | | OUTPUT | | |
|---|---|---|---|---|---|---|---|---|---|---|
| COMPARING | | | | CASCADING | | | | | | |
| CA[3], K[3] | CA[2], K[2] | CA[1], K[1] | CA[0], K[0] | SM1IM CA<K | EQ1IM CA=K | LG1IM CA>K | | SM1 CA<K | EQ1 CA=K | LG1 CA>K |
| CA[3] > K[3] | X | X | X | X | X | X | | 0 | 0 | 1 |
| CA[3] = K[3] | CA[2] > K[2] | X | X | X | X | X | | 0 | 0 | 1 |
| CA[3] = K[3] | CA[2] = K[2] | CA[1] > K[1] | X | X | X | X | | 0 | 0 | 1 |
| CA[3] = K[3] | CA[2] = K[2] | CA[1] = K[1] | CA[0] > K[0] | X | X | X | | 0 | 0 | 1 |
| CA[3] = K[3] | CA[2] = K[2] | CA[1] = K[1] | CA[0] = K[0] | 0 | 0 | 1 | | 0 | 0 | 1 |
| CA[3] = K[3] | CA[2] = K[2] | CA[1] = K[1] | CA[0] = K[0] | 0 | 1 | 0 | | 0 | 1 | 0 |
| CA[3] = K[3] | CA[2] = K[2] | CA[1] = K[1] | CA[0] = K[0] | 1 | 0 | 0 | | 1 | 0 | 0 |
| CA[3] = K[3] | CA[2] = K[2] | CA[1] = K[1] | CA[0] < K[0] | X | X | X | | 1 | 0 | 0 |
| CA[3] = K[3] | CA[2] = K[2] | CA[1] < K[1] | X | X | X | X | | 1 | 0 | 0 |
| CA[3] = K[3] | CA[2] < K[2] | X | X | X | X | X | | 1 | 0 | 0 |
| CA[3] < K[3] | X | X | X | X | X | X | | 1 | 0 | 0 |

FIG. 16

| INPUT | | | | | | | | OUTPUT | | |
|---|---|---|---|---|---|---|---|---|---|---|
| COMPARING | | | | CASCADING | | | | | | |
| K[3], CB[3] | K[2], CB[2] | K[1], CB[1] | K[0], CB[0] | SM2IM K<CB | EQ2IM K=CB | LGC2IM K>CB | | SM2 K<CB | EQ2 K=CB | LG2 K>CB |
| K[3]>CB[3] | X | X | X | X | X | X | | 0 | 0 | 1 |
| K[3]=CB[3] | K[2]>CB[2] | X | X | X | X | X | | 0 | 0 | 1 |
| K[3]=CB[3] | K[2]=CB[2] | K[1]>CB[1] | X | X | X | X | | 0 | 0 | 1 |
| K[3]=CB[3] | K[2]=CB[2] | K[1]=CB[1] | K[0]>CB[0] | X | X | X | | 0 | 0 | 1 |
| K[3]=CB[3] | K[2]=CB[2] | K[1]=CB[1] | K[0]=CB[0] | 0 | 0 | 1 | | 0 | 0 | 1 |
| K[3]=CB[3] | K[2]=CB[2] | K[1]=CB[1] | K[0]=CB[0] | 0 | 1 | 0 | | 0 | 1 | 0 |
| K[3]=CB[3] | K[2]=CB[2] | K[1]=CB[1] | K[0]=CB[0] | 1 | 0 | 0 | | 1 | 0 | 0 |
| K[3]=CB[3] | K[2]=CB[2] | K[1]=CB[1] | K[0]<CB[0] | X | X | X | | 1 | 0 | 0 |
| K[3]=CB[3] | K[2]=CB[2] | K[1]<CB[1] | X | X | X | X | | 1 | 0 | 0 |
| K[3]=CB[3] | K[2]<CB[2] | X | X | X | X | X | | 1 | 0 | 0 |
| K[3]<CB[3] | X | X | X | X | X | X | | 1 | 0 | 0 |

FIG. 17

|  | MATCH SEARCH | | | | | |
|---|---|---|---|---|---|---|
| MODE[2m+0:2m+1] | 00 | 00 | 00 | 00 | 00 | 00 |
| LINK[m] | 0 | 0 | 0 | 1 | 1 | 1 |
| LG1 | 1 | 0 | 0 | 1 | 0 | 0 |
| EQ1 | 0 | 1 | 0 | 0 | 1 | 0 |
| SM1 | 0 | 0 | 1 | 0 | 0 | 1 |
| LG2 | X | X | X | X | X | X |
| EQ2 | X | X | X | X | X | X |
| SM2 | X | X | X | X | X | X |
| GMASK[4m+0:4m+3] or CONTB[4m+0:4m+3] | X | X | X | X | X | X |
| AFIm | X | X | X | X | X | X |
| LG1Om | 1 | 0 | 0 | 0 | 0 | 0 |
| EQ1Om | 0 | 1 | 0 | 1 | 1 | 1 |
| SM1Om | 0 | 0 | 1 | 0 | 0 | 0 |
| AFOm | 0 | 0 | 0 | 0 | 0 | 0 |
| LG2Om | X | X | X | X | X | X |
| EQ2Om | X | X | X | X | X | X |
| SM2Om | X | X | X | X | X | X |
| DC | 1 | 1 | 1 | 1 | 1 | 1 |
| Hm | 0 | 1 | 0 | 0 | 1 | 0 |

FIG. 18

| | RANGE SEARCH (CA ≥ K) and (k ≥ CB) | | | | | | | | | | | | | | | | |
|---|---|---|---|---|---|---|---|---|---|---|---|---|---|---|---|---|---|
| MODE[2m+0:2m+1] | 10 | 10 | 10 | 10 | 10 | 10 | 10 | 10 | 10 | 10 | 10 | 10 | 10 | 10 | 10 | 10 | 10 |
| LINK[m] | 0 | 1 | 0 | 0 | 0 | 0 | 0 | 0 | 0 | 1 | 1 | 1 | 1 | 1 | 1 | 1 | 1 |
| LG1 | 1 | 1 | 1 | 0 | 0 | 0 | 0 | 0 | 0 | 1 | 1 | 0 | 0 | 0 | 0 | 0 | 0 |
| EQ1 | 0 | 0 | 0 | 1 | 1 | 1 | 1 | 0 | 0 | 0 | 1 | 1 | 1 | 0 | 0 | 0 | X |
| SM1 | 0 | 0 | 0 | 0 | 0 | 0 | 0 | 1 | 1 | 0 | 0 | 0 | 0 | 1 | 1 | 1 | X |
| LG2 | 1 | 0 | 0 | 1 | 0 | 1 | 0 | 1 | 0 | 1 | 0 | 1 | 0 | 1 | 0 | 1 | X |
| EQ2 | 0 | 1 | 0 | 0 | 1 | 0 | 1 | 0 | 1 | 0 | 1 | 0 | 1 | 0 | 1 | 0 | X |
| SM2 | 0 | 0 | 1 | 0 | 0 | 0 | 0 | 0 | 0 | 1 | 0 | 0 | 0 | 0 | 0 | 0 | X |
| CONTB[4m+0:4m+3] | X | X | X | X | X | X | X | X | X | X | X | X | X | X | X | X | X |
| GMASK[4m+0:4m+3] | X | X | X | X | X | X | X | ≠0xF | ≠0xF | ≠0xF | ≠0xF | ≠0xF | ≠0xF | ≠0xF | ≠0xF | ≠0xF | =0xF |
| AFIm | X | X | X | X | X | X | X | X | X | X | X | X | X | X | X | X | X |
| LG1Om | 1 | 1 | 0 | 0 | 0 | 0 | 0 | 0 | 0 | 0 | 0 | 0 | 0 | 0 | 0 | 0 | 0 |
| EQ1Om | 0 | 0 | 1 | 1 | 1 | 1 | 1 | 0 | 0 | 0 | 1 | 1 | 1 | 1 | 1 | 1 | 1 |
| SM1Om | 0 | 0 | 0 | 0 | 0 | 0 | 0 | 1 | 1 | 0 | 0 | 0 | 0 | 0 | 0 | 0 | 0 |
| AFOm | X | X | X | X | X | X | X | X | X | X | X | X | X | X | X | X | X |
| LG2Om | 1 | 0 | 0 | 1 | 0 | 1 | 0 | 1 | 0 | 1 | 0 | 1 | 0 | 1 | 0 | 1 | 0 |
| EQ2Om | 0 | 1 | 0 | 0 | 1 | 0 | 1 | 0 | 1 | 0 | 1 | 0 | 1 | 0 | 1 | 0 | 1 |
| SM2Om | 0 | 0 | 1 | 0 | 0 | 0 | 0 | 0 | 0 | 1 | 0 | 0 | 0 | 0 | 0 | 0 | 0 |
| DC | 0 | 0 | 0 | 0 | 0 | 0 | 0 | 0 | 0 | 0 | 0 | 0 | 0 | 0 | 0 | 0 | 0 |
| Hm | 0 | 0 | 0 | 0 | 0 | 0 | 0 | 0 | 0 | 1 | 1 | 0 | 0 | 0 | 0 | 0 | 1 |

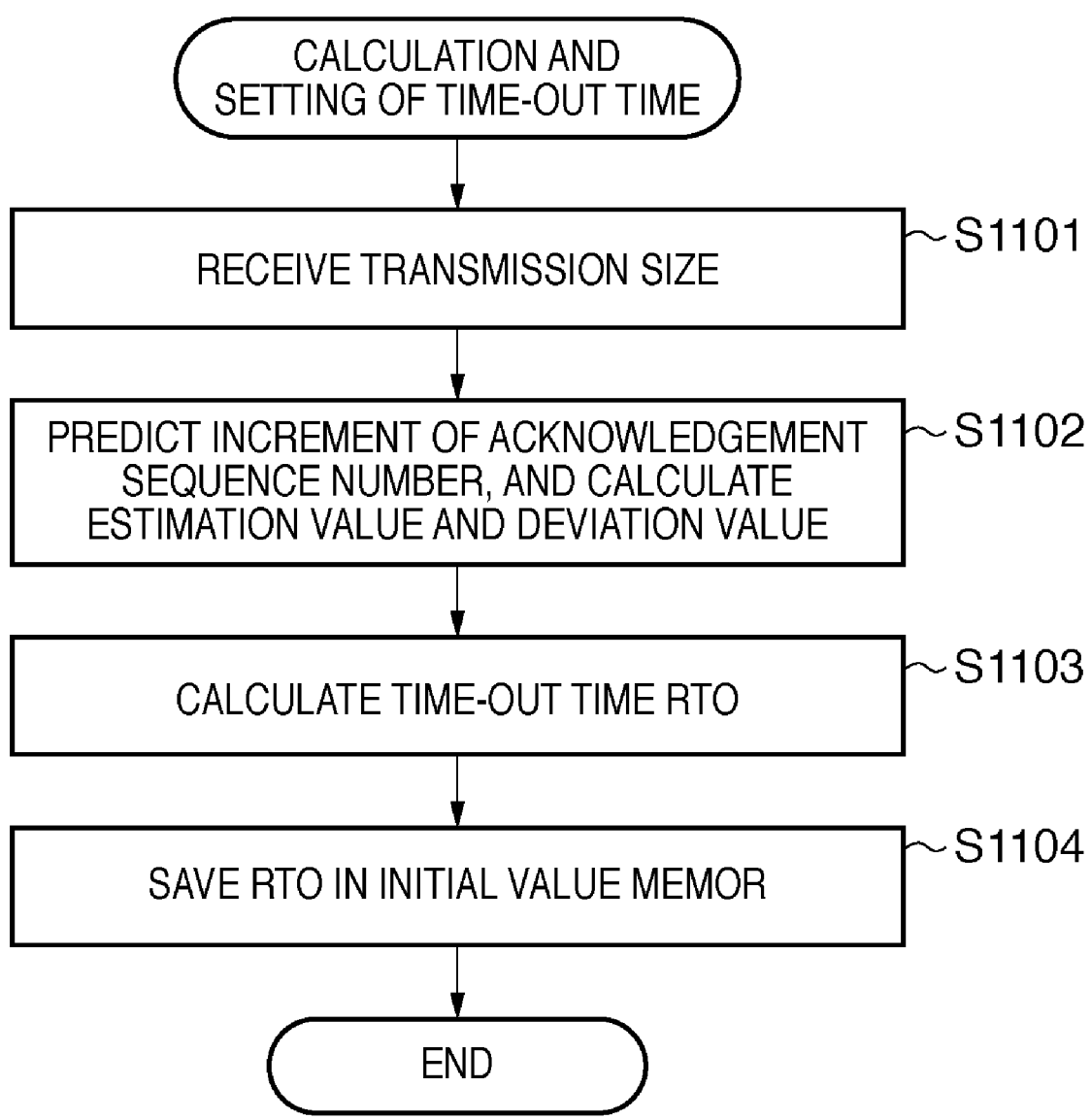

COMMUNICATION APPARATUS AND METHOD OF CALCULATING ROUND TRIP TIME

BACKGROUND OF THE INVENTION

1. Field of the Invention

The present invention relates to a communication apparatus and a method of calculating a round trip time.

2. Description of the Related Art

TCP serving as a connection-type protocol uses several kinds of timers to avoid an interruption of communication. Time-out times to be set in the timers are determined by transmitting a segment having an arbitrary sequence number to the other end, measuring a round trip time until the sequence number is acknowledged, and reflecting the immediately preceding state of a transmission channel and that of the other end. Japanese patent No. 3476985 has proposed to adjust a transfer size in accordance with a measured round trip time.

Conventionally, round trip time measurement processing makes a next measurement after a measurement is completed. The measurement interval is therefore conventionally long. As a result, congestion occurs, and it is impossible to follow a sudden change in state such as a change in load of the other end.

As represented by a 10-gigabit network in recent years, the use of wideband communication media and incorporating a TOE (TCP/IP Offload Engine) in network devices have improved communication performance. There is, therefore, a demand for improving the accuracy of round trip time measurement.

In application examples such as moving image stream distribution and video conference systems in which contents are transmitted in real time, there is a demand for enhancing QoS. The key to enhancement of QoS is to grasp a short-term variation in round trip time and improve the accuracy of time measurement.

SUMMARY OF THE INVENTION

The present invention provides an apparatus and a method that improve the accuracy of round trip time measurement.

According to one aspect of the present invention, there is provided a communication apparatus which transmits data to a transmission destination, and receives, from the transmission destination, an acknowledgement indicating that the data has been received, comprising: a memory unit configured to store first specific data for specifying a plurality of transmission data, and transmission time data indicating transmission times of the plurality of transmission data; a search unit that searches, based on second specific data contained in the acknowledgement, the memory unit for first specific data for specifying transmission data corresponding to the acknowledgement; and a unit that calculates a round trip time based on a transmission time of the transmission data specified by the first specific data found by the search unit, and a reception time at which the acknowledgement is received.

Further features of the present invention will become apparent from the following description of exemplary embodiments with reference to the attached drawings.

BRIEF DESCRIPTION OF THE DRAWINGS

FIG. 7 is a view showing various pieces of information stored in the memory of the RTT measurement processing unit according to the embodiment;

FIG. 8 is a block diagram for explaining a search unit according to the embodiment in detail;

FIG. 14 is a diagram for explaining a comparator core portion according to the embodiment in detail;

FIG. 15 is a truth table of a 4-bit magnitude comparator_1 according to the embodiment;

FIG. 16 is a truth table of a 4-bit magnitude comparator_2 according to the embodiment;

FIG. 17 is a truth table of a selector in a match search mode according to the embodiment;

FIG. 18 is a truth table of the selector in a range search mode according to the embodiment;

FIG. 21 is a flowchart showing processing of calculating and setting a time-out time according to the embodiment.

DESCRIPTION OF THE EMBODIMENTS

Best modes for carrying out the present invention will be described in detail below with reference to the accompanying drawings. First, the arrangement of a communication apparatus including a TOE subsystem will be explained with reference to FIGS. 1 and 2. Note that TOE is an abbreviation for TCP (Transmission Control Protocol)/IP (Internet Protocol) Offload Engine.

Figure 1:
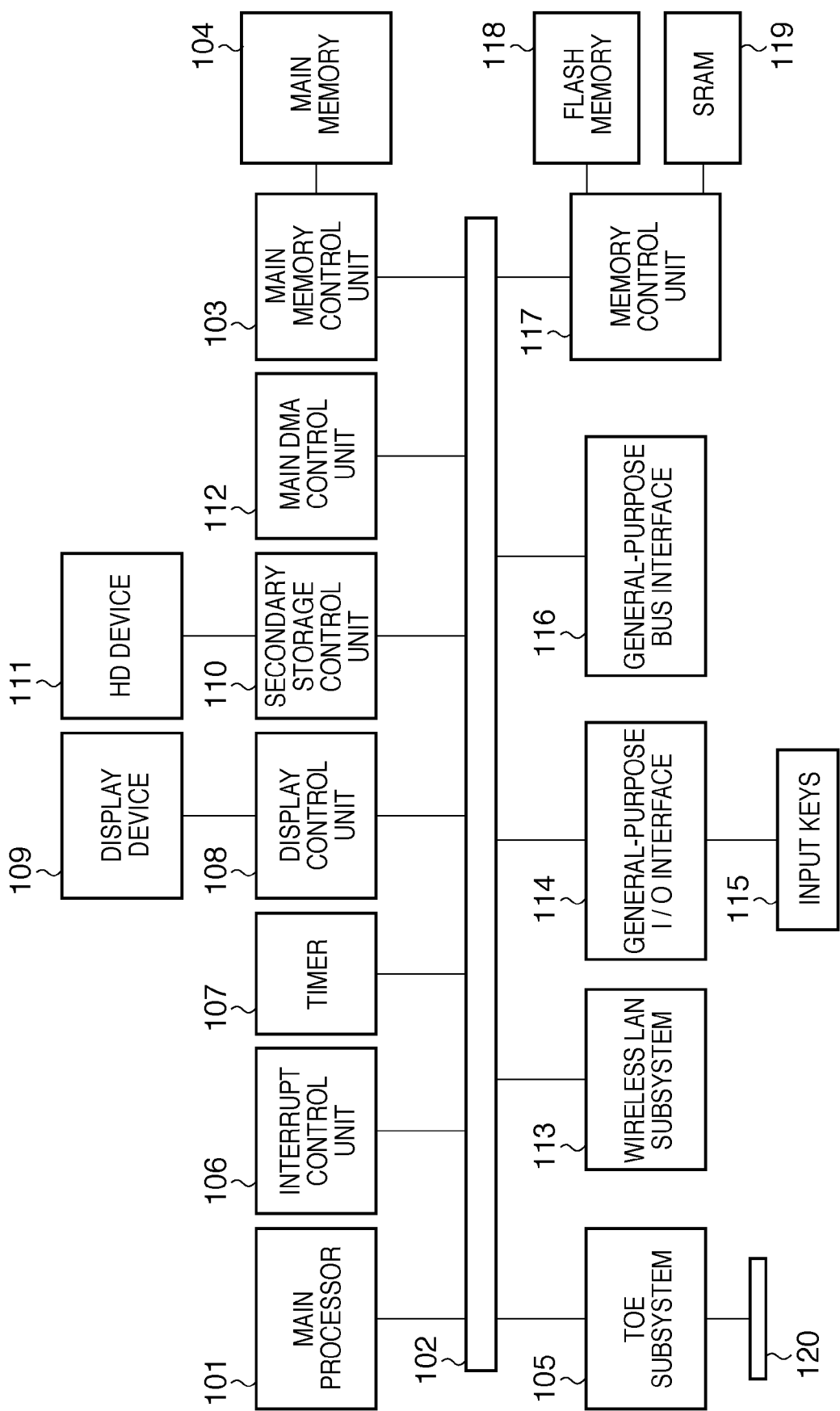
FIG. 1 is a block diagram showing an arrangement of a communication apparatus according to an embodiment.

FIG. 1 is a block diagram showing an arrangement of a communication apparatus according to an embodiment. The communication apparatus includes units 101, 103, 105 to 108, 110, 112 to 114, 116, and 117, as shown in FIG. 1. These units are connected to each other via a system bus 102. The system bus 102 is an on-chip bus having a crossbar switch structure, and can perform a parallel transfer operation of transmission/reception data required by the communication apparatus. The on-chip bus complies with the AMBA 3.0 on-chip bus standard which additionally includes an AXI (Advanced eXtensible Interface) protocol.

The main processor 101 executes a boot program within a flash memory 118 upon power-on. After initializing pieces of hardware and subsystems, the main processor 101 loads software stored in an HD (Hard Disk) device 111 onto a main memory 104, and starts an OS (Operating System) included in the software. The main memory control unit 103 controls access to the main memory 104.

The TOE subsystem 105 controls data communication performed with an external network via an Ethernet® 120. The detailed configuration and operation of the TOE subsystem 105 will be described later.

When interrupt events occur in the hardware, TOE subsystem 105, and wireless LAN subsystem 113, the interrupt control unit 106 notifies the main processor 101 of the occurred interrupt events in accordance with a predetermined priority order. Software or the like starts the timer 107, thereby generating a time measurement or time-out event. The display control unit 108 controls a display device 109 which displays a status and setting contents of an application.

The secondary storage control unit 110 controls access to the HD device 111. The HD device 111 stores software for implementing the functions of the communication apparatus and associated data, and microcodes executed by sub-processors and a sequencer within each subsystem and associated data. The HD device 111 also stores communication data, and log information such as the operation log and communication log of the communication apparatus.

The main DMA control unit 112 controls data transfer between the main processor 101 and the main memory 104, and data transfer between memories.

The wireless LAN subsystem 113 provides a wireless LAN function complying with the IEEE802.11a/b/g/n standards. The general-purpose I/O interface 114 is an interface with input keys 115 for setting an operation mode of the communication apparatus or inputting communication parameters represented by an IP address. The general-purpose bus interface 116 is an interface for a general-purpose bus represented by PCI (Peripheral Component Interconnect). Note that the PCI is defined by the PCI Special Interest Group, and is a general-purpose bus as a standard in the industry.

The memory control unit 117 controls access to the flash memory 118 serving as a rewritable nonvolatile memory and an SRAM 119 serving as a high-speed primary memory (cache). Note that the flash memory 118 stores parameters necessary for the boot program which is executed upon power-on, or initialization. The flash memory 118 also stores device drivers for controlling the pieces of hardware upon power-on, and stores setting parameters at the start of the pieces of hardware.

Figure 2:
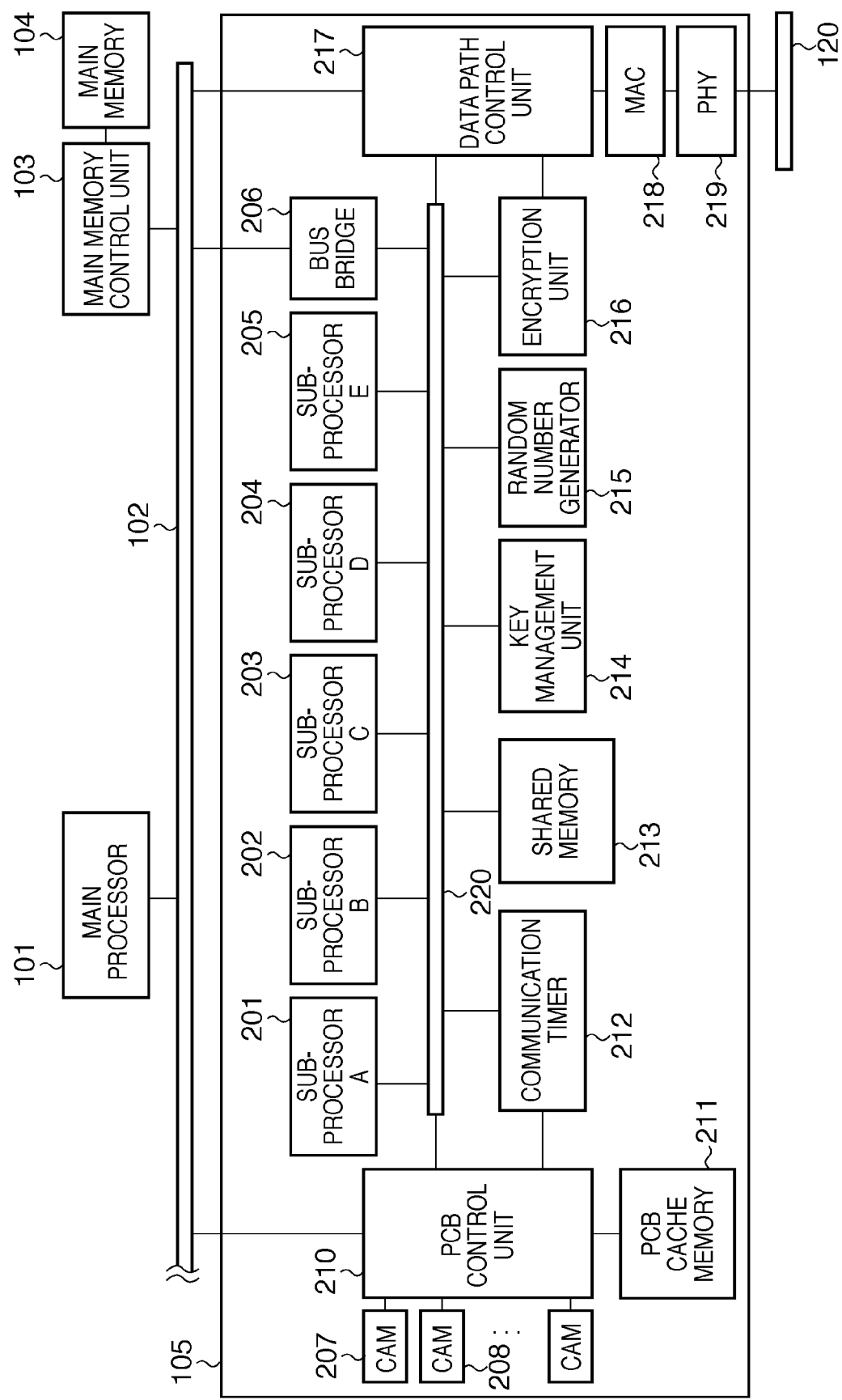
FIG. 2 is a block diagram showing an internal configuration of a TOE subsystem 105 shown in FIG. 1.

FIG. 2 is a block diagram showing an internal configuration of the TOE subsystem 105 shown in FIG. 1. Sub-processors A to E 201 to 205, a bus bridge 206, a PCB control unit 210, a communication timer 212, a shared memory 213, a key management unit 214, a random number generator 215, an encryption unit 216, and a data path control unit 217 are connected to a subsystem bus 220. The subsystem bus 220 has a crossbar switch architecture.

The sub-processors A to E 201 to 205 execute TCP/IP protocol processing offloaded from the main side. When initializing the TOE subsystem 105, firmware to be executed by the sub-processors A to E 201 to 205 is rasterized on the main memory 104, loaded into their instruction cache memories, and then executed. The bus bridge 206 interconnects the system bus 102 on the main side and the subsystem bus 220.

The PCB control unit 210 performs generation, deletion, access control, and holding management of a PCB which is a name for context information or a set of pieces of context information necessary for processing each network protocol. The PCB is an abbreviation for Protocol Control Block. The PCB control unit 210 connects to a PCB cache memory 211 which temporarily holds a PCB to allow the sub-processors A to E 201 to 205 to refer to or rewrite it within a short time.

Furthermore, a plurality of CAMs (Content Addressable Memories) 207 and 208 is connected to the PCB control unit 210. The CAM 207 is a memory used for a search using information extracted from a reception frame as a key to specify a PCB. The CAM 208 is a memory used for determining whether a desired PCB exists on the PCB cache memory 211. That is, the CAM is a memory for reporting as a search result, when data as a search key matches data registered in the CAM, information on an address at which the data is stored.

Note that if a plurality of identical data exists in a CAM, all the data are reported. In this embodiment, however, a plurality of identical data does not exist.

The communication timer 212 generates a time measurement or time-out event necessary for TCP/IP protocol processing. The shared memory 213 is a memory for sharing information and communication between the sub-processors A to E 201 to 205.

The key management unit 214 secretly holds an encryption key, random number, and prime number generated for encryption communication protocol processing. The random number generator 215 generates a random number for the TCP/IP protocol processing and the encryption communication protocol processing. The encryption unit 216 executes the encryption communication protocol processing for, for example, IPsec and SSL/TLS. The encryption unit 216 includes an AES (Advanced Encryption Standard) encryption unit. The encryption unit 216 also includes a SHA-1 (Secure Hash Algorithm 1) hash function unit and an MD5 (Message Digest 5) hash function unit.

A MAC (Media Access Control) 218 is hardware for dealing with protocol processing for a MAC layer corresponding to a data link layer (the second layer) in an OSI reference model. A PHY (Physical Layer Chip) 219 is hardware for dealing with electrical signals and protocol processing for a PHY (physical) layer corresponding to the first layer in the OSI reference model.

The data path control unit 217 includes a buffer memory which temporarily holds data to be transmitted/received, a controller which controls the buffer memory, a DMA control unit which transfers data, and a checksum computing unit which computes a checksum during DMA processing.

More specifically, the data path control unit 217 includes a reception buffer memory which temporarily holds a reception frame processed in the MAC 218, and a reception buffer memory controller to allow the sub-processors A to E 201 to 205 to refer to the protocol headers of respective layers in the reception frame. The data path control unit 217 also includes a transmission buffer memory which temporarily holds transmission data, and a transmission buffer memory controller to allow the sub-processors A to E 201 to 205 to form the protocol headers of the respective layers in the held transmission data. A DMA control unit of the data path control unit 217 performs data transfer between the transmission and reception buffer memories and the main memory 104, and data transfer between the transmission and reception buffer memories and the MAC 218.

Figure 3:
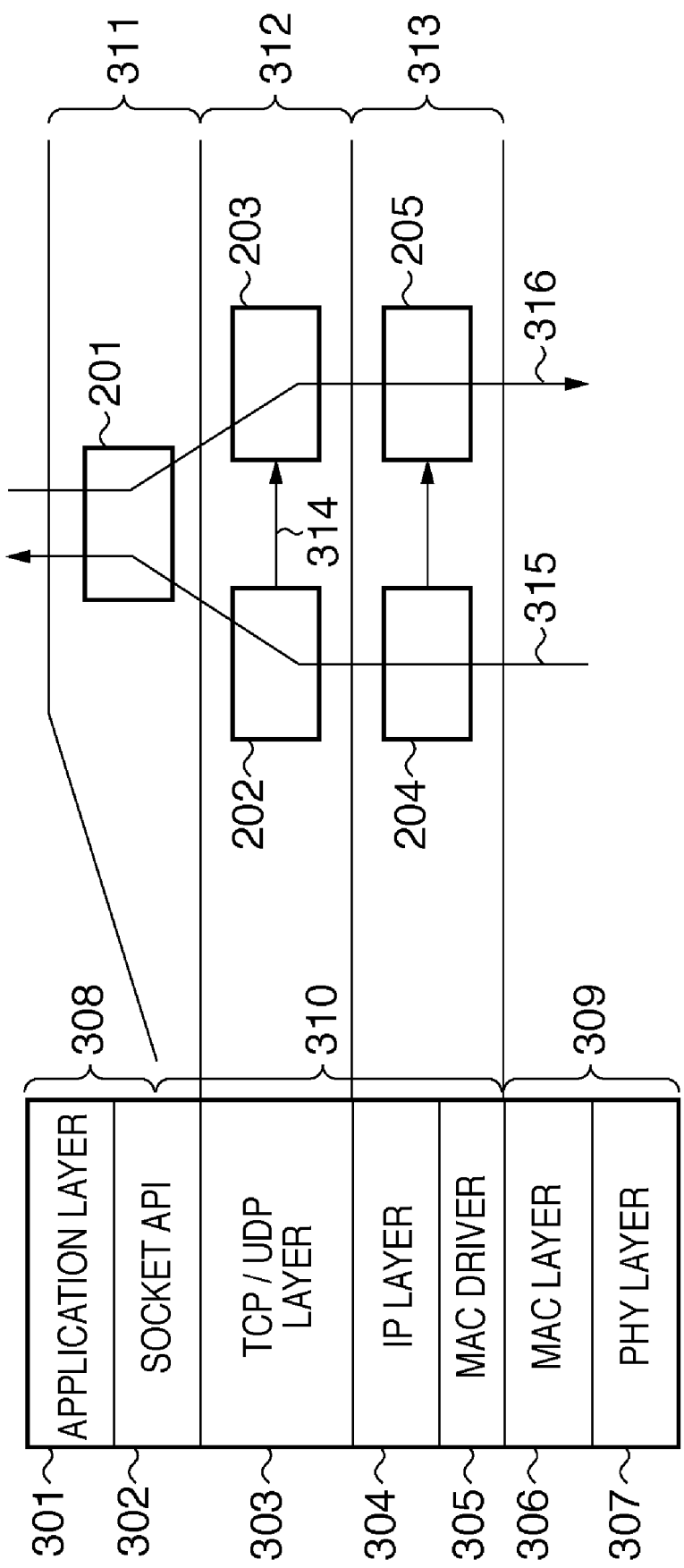
FIG. 3 is a view for explaining the roles of a plurality of sub-processors in the TOE subsystem.

The roles of the sub-processors A to E 201 to 205 in the TOE subsystem 105 will be described with reference to FIG. 3. FIG. 3 is a view for explaining the roles of the plurality of sub-processors in the TOE subsystem. The processing function of the TOE subsystem 105 mainly selects a protocol and relays data exchange and information communication to cover a range 310 shown in FIG. 3. That is, the TOE subsystem 105 covers the functions of a MAC driver 305 which exchanges communication data and communication information with a MAC layer 306, an Internet layer (IP layer) 304 which processes an IP protocol, and a transport layer (TCP/UDP layer) 303 which processes TCP and UDP protocols. Furthermore, the TOE subsystem 105 covers part of the function of a socket API 302.

As shown in FIG. 3, these functions are divided and processed in the sub-processors A to E 201 to 205. For example, the processing in the socket API 302 is assigned to the sub-processor A 201. Among the TCP and UDP protocol processing, processing associated with reception operations is assigned to the sub-processor B 202, and processing associated with transmission operations is assigned to the sub-processor C 203. Among the processing in the MAC driver 305 and the IP protocol processing, processing associated with reception operations is assigned to the sub-processor D 204, and processing associated with transmission operations is assigned to the sub-processor E 205.

Note that the functions are divided to divide a series of network protocol processes into three pipeline stages 311 to 313 to perform pipeline operations. Separation of transmission operations and reception operations allows the sub-processors responsible for the respective functions to operate in parallel.

In TCP, start of logical channel formation will be referred to as connection establishment, and end of logical channel formation will be referred to as connection release. A state in the period of time between connection establishment and connection release will be referred to as an establishment state or connection state, or simply a connection. It is possible to establish a plurality of connections between two network devices, and to establish a plurality of connections between a plurality of other network devices. Note that a connection is expressed by a set of four pieces of information, that is, the IP addresses and TCP port numbers of the two network devices involved. The set of information will be referred to as socket pair information or socket information. The TCP header of each TCP packet transmitted/received after connection establishment contains socket information.

From the viewpoint of guaranteeing the arrival of transfer data, TCP transmits arrival acknowledgement information to be referred to as an acknowledgement from the data reception side to the data transmission side during a connection. To execute the acknowledgement processing, it is necessary to perform transmission, denoted by reference numeral 314, of the arrival acknowledgement information between the sub-processor B 202 and the sub-processor C 203.

These information transmission and information sharing, those between the pipeline stages, and those between the main processor 101 and the sub-processors A to E 201 to 205 forming the pipeline stages are done via the shared memory 213. These information transmission and information sharing may also be done using the main memory 104, as a matter of course.

In TCP, several kinds of timers individually operate for each connection (socket) in addition to the above-described timers. As an example of those timers, the arrangement of the communication timer 212 in this embodiment will be explained with reference to FIGS. 4 and 5.

Figure 4:
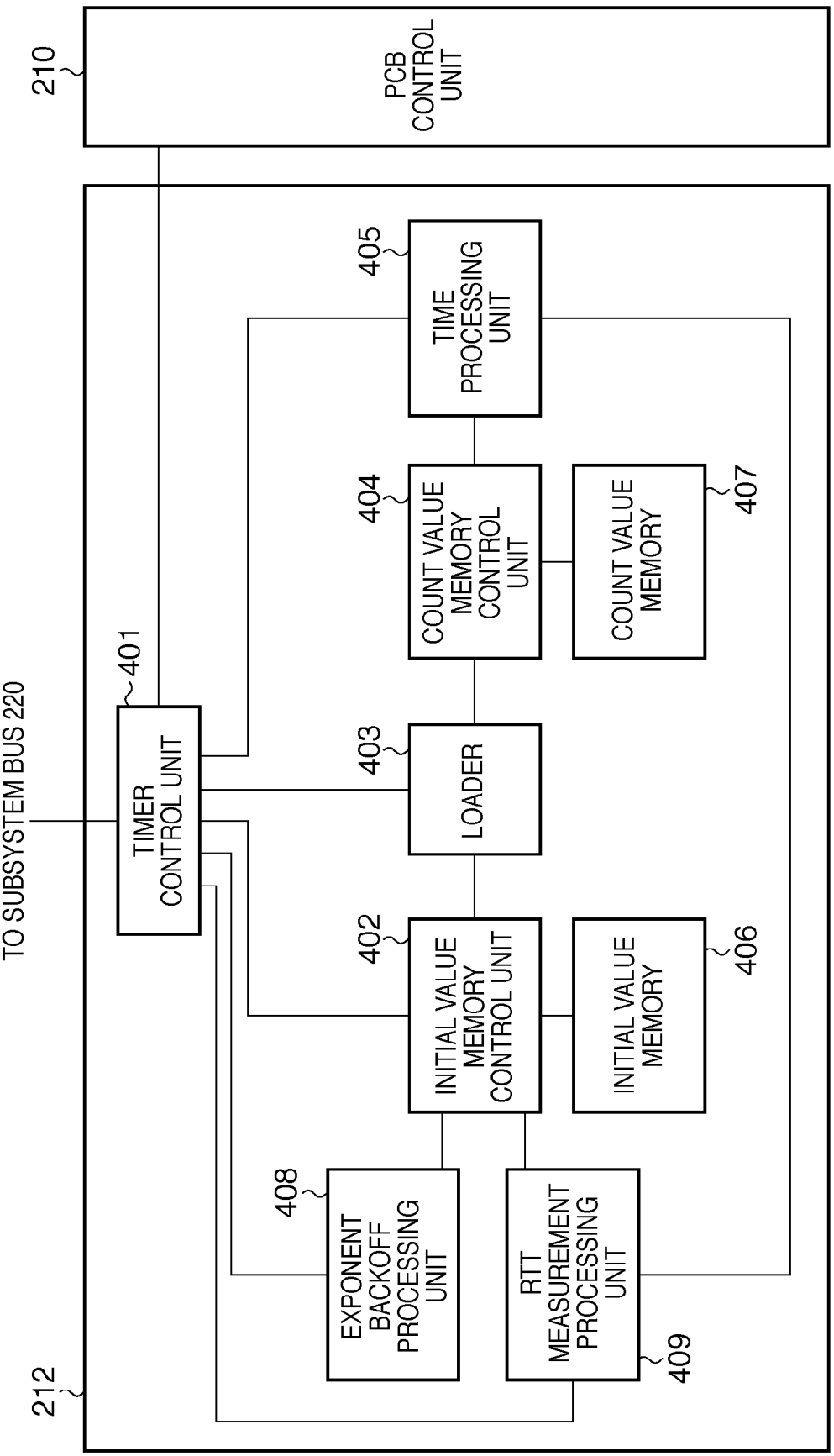
FIG. 4 is a block diagram showing an arrangement of a communication timer according to the embodiment.

FIG. 4 is a block diagram showing an arrangement of the communication timer 212 according to the embodiment. As shown in FIG. 4, the communication timer 212 includes a timer control unit 401 which controls the communication timer 212 as a whole and functions as an interface (I/F) with external units. The communication timer 212 also includes an initial value memory 406 which holds an initial value of a timer held for each pair of the timer and a connection, and an initial value memory control unit 402 which writes/reads the initial value.

Furthermore, the communication timer 212 includes a count value memory 407 which holds the progress of the timer during operation, and a count value memory control unit 404 which writes/reads the progress. The communication timer 212 also has a loader 403 which transfers, from the initial value memory 406 to the count value memory 407, an initial value for a pair of a timer and connection designated by an instruction of the timer control unit 401. The communication timer 212 includes a time processing unit 405 which performs processing of reading out and determining a timer count value stored in the count value memory 407 and rewriting an update result at regular intervals. In addition, the communication timer 212 includes an exponent backoff processing unit 408 which doubles the initial value of a timer to update the memory 406 when a time-out occurs.

Furthermore, the communication timer 212 has an RTT measurement processing unit 409 which performs round trip time measurement for each connection, and updates the initial value of the timer based on the measurement result. The initial value of the timer represents a time-out time value which is given to the timer when the timer is started. The time processing unit 405 holds a determination result as event information in an incorporated event FIFO, and transmits the determination result to the timer control unit 401.

The arrangement of the RTT measurement processing unit 409 shown in FIG. 4 will be described with reference to FIGS. 5 to 7.

Figure 5:
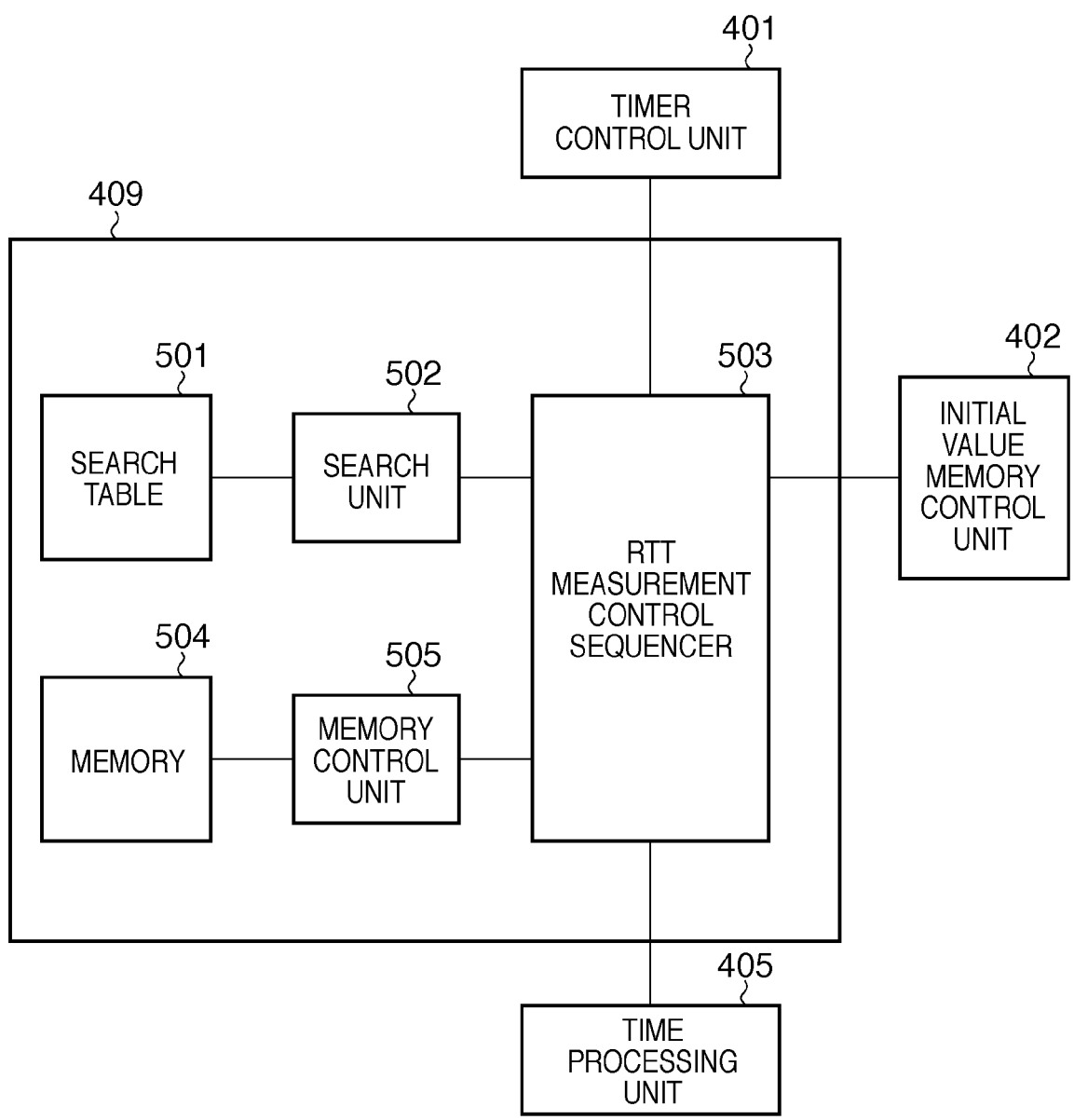
FIG. 5 is a block diagram showing an arrangement of an RTT measurement processing unit according to the embodiment.

FIG. 5 is a block diagram showing an arrangement of the RTT measurement processing unit 409 according to the embodiment. As shown in FIG. 5, an RTT measurement control sequencer 503 controls the RTT measurement processing unit 409. When transmitting a TCP segment, round trip time measurement is started. The sub-processors A to E 201 to 205 transmit information about the segment transmission to the RTT measurement control sequencer 503 via the data path control unit 217. The RTT measurement control sequencer 503 registers part of the transmitted information in a search table 501 in a form shown in FIG. 6A, and registers it in a memory 504 in a form shown in FIG. 6B.

Figure 6A:
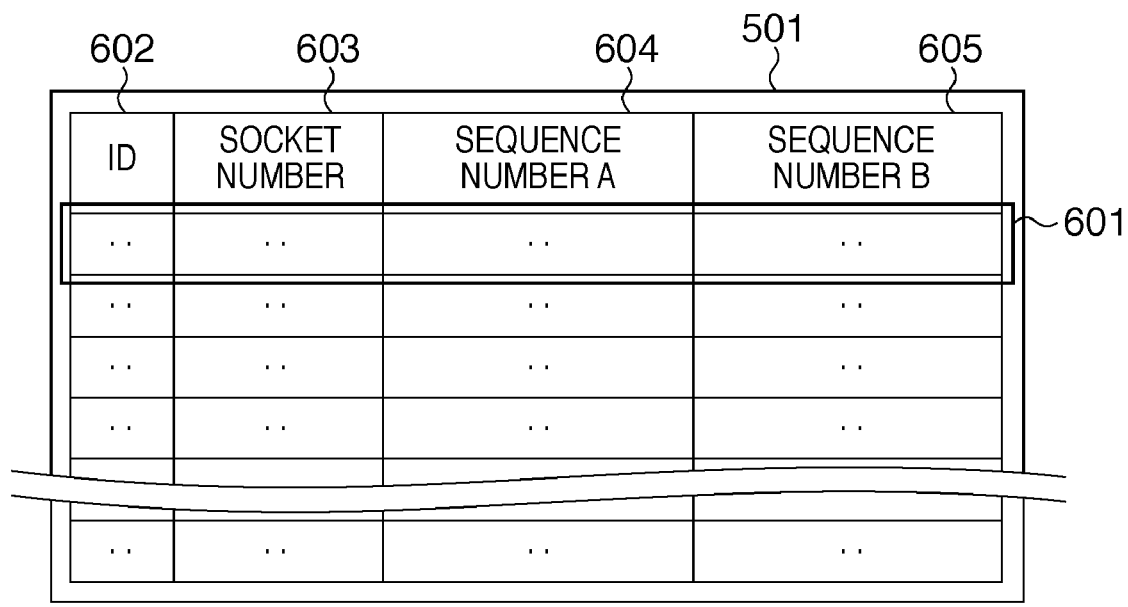
FIG. 6A is a view showing a structure of a search table in the RTT measurement processing unit.

FIG. 6A is a view showing a structure of the search table 501 in the RTT measurement processing unit 409. Reference numeral 601 denotes start information formed by pieces of information 602 to 605. The information 602 indicates an identifier for identifying start information; the information 603, a socket number as connection information; the information 604, a sequence number A representing the start sequence number of transmission segments as data information; and the information 605, a sequence number B indicating the end sequence number of the segments. As described above, at the start of round trip time measurement, part of the transmitted information is registered as start information in the search table 501.

Figure 6B:
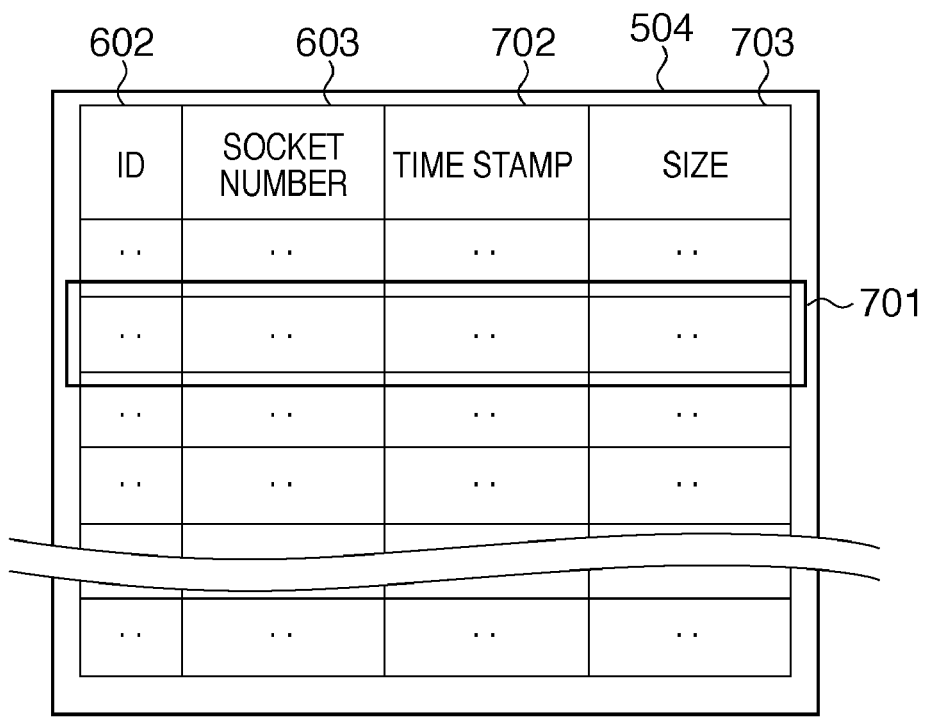
FIG. 6B is a view showing a structure of a memory in the RTT measurement processing unit.
Figure 9A:
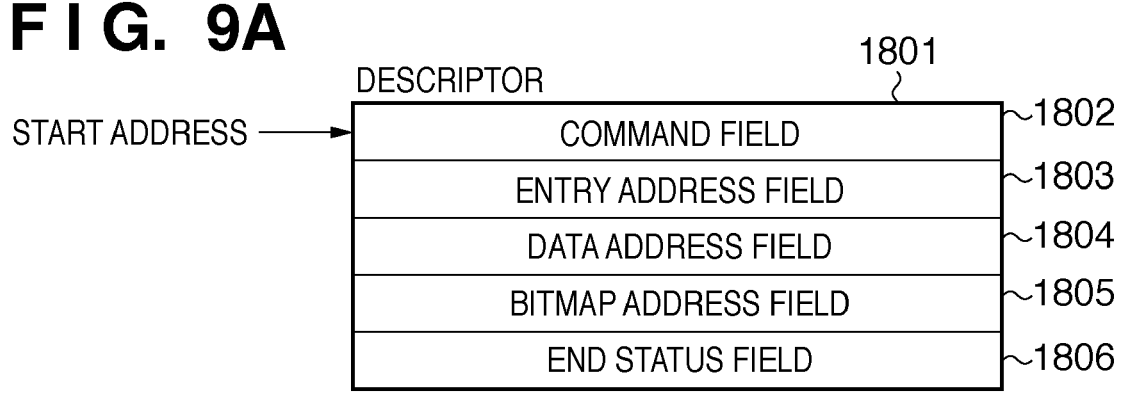
FIGS. 9A, 9B, and 9C are views respectively showing the data structure of a descriptor, the structure of a registration/reference data buffer, and search data according to the embodiment.
Figure 9B:
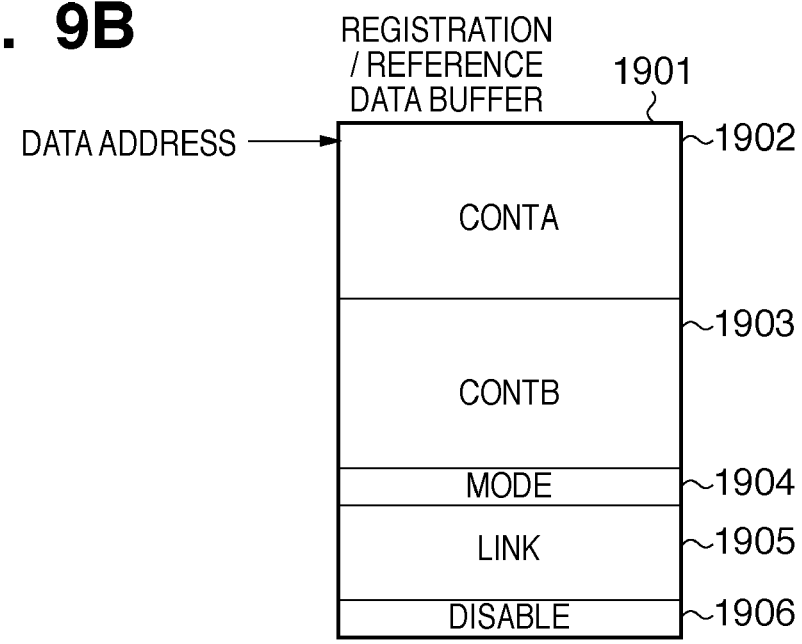
Figure 9C:
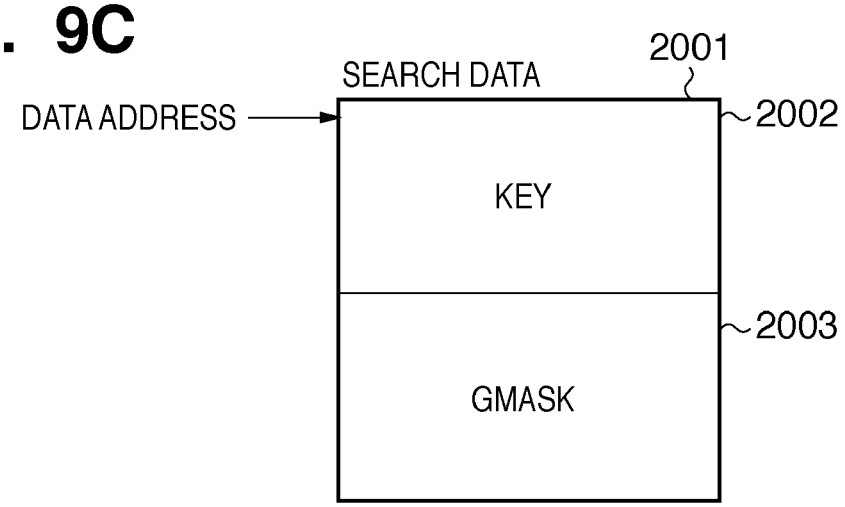

FIG. 6B is a view showing a structure of the memory 504 in the RTT measurement processing unit 409. As shown in FIG. 6B, information 701 formed by the identifier 602, the socket number 603, a time stamp 702, and a size 703 is registered in the memory 504.

The RTT measurement control sequencer 503 ends the round trip time measurement upon receiving a TCP acknowledgement, and saves a measured value and various values derived from the measured value in a form shown in FIG. 7. FIG. 7 is a view showing various pieces of information saved in the memory 504 of the RTT measurement processing unit 409 according to the embodiment. At the end of the round trip time measurement, values other than the identifier 602, socket number 603, time stamp 702, and size 703 shown in FIG. 6B are appended. Referring to FIG. 7, RTTpre_u_A or RTTpre_u_B indicates a round trip time for a unit size and DEVpre_u_A or DEVpre_u_B indicates a deviation value for a unit size. Details of these values will be described later.

A search unit 502 searches for the start information 601 in the search table 501 using, as search keys, the socket number of the acknowledgement given from the RTT measurement control sequencer 503, and a value obtained by subtracting one from the acknowledgement number (sequence number), in accordance with conditional expression (1) below. The reason why one is subtracted from the acknowledgement number is that the acknowledgement sequence number is obtained by adding one to the last sequence number of the transmission segments.

socket number=socket number as a search key; and $$\text{sequence number } A \leq (\text{sequence number} - 1) \text{ given as a search key} \leq \text{sequence number } B \quad (1)$$

Details of the search unit 502 will now be explained with reference to FIGS. 8 to 18.

FIG. 8 is a block diagram for explaining an example in detail in which the search unit 502 includes the search table 501. The search unit 502 reads out a descriptor 1801 and accompanying various data (a registration/reference data buffer 1901 and search data 2001) shown in FIGS. 9A to 9C, and then executes command processes such as search, registration, reference, and delete processes as main functions. This read processing is performed by a DMAC (Direct Memory Access Controller) 1309 incorporated in an interface unit 1302.

Figure 10:
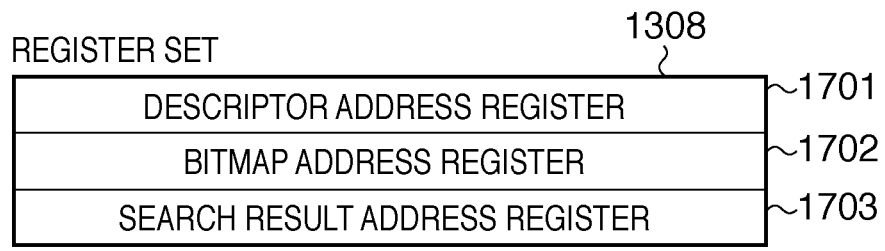
FIG. 10 is a block diagram showing the arrangement of a register set incorporated in an interface unit according to the embodiment.

The interface unit 1302 includes a register set 1308. FIG. 10 shows details of the register set 1308. The register set 1308 includes a descriptor address register 1701, bitmap address register 1702, and search result address register 1703. A command is transmitted to the search unit 502 by writing, in the descriptor address register 1701, the start address of the descriptor 1801 stored in an external memory 1307. The external memory 1307 serves as the shared memory 213 in the TOE subsystem 105. The sub-processors A to E 201 to 205 and the main processor 101 write information in the external memory 1307. The written start address of the descriptor 1801 is temporarily stored in a FIFO (first-in first-out memory) 1310 incorporated in the interface unit 1302.

The search unit 502 retrieves the start address of the descriptor 1801 from the FIFO 1310, uses the retrieved start address to read out the descriptor 1801 and the accompanying various data (the registration/reference data buffer 1901 and search data 2001) by the DMAC 1309, and then executes the command.

A register within the register set 1308 is selected by a REG_ADDR signal. Data to be written in the selected register is transmitted by a WRITE_DATA signal, and is written in the register by a WRITE_REG signal. Data to be read out from the register is selected by the REG_ADDR signal and a READ_REG signal, and is transmitted outside the search unit 502 by a READ_DATA signal.

The DMAC 1309 controls a DMA operation using a DMA_REQ signal and a DMA_RDY signal in addition to a DMA_ADDR signal which selects the address of the external memory 1307. During the DMA operation, data to be written/read is transmitted by a DMA_WRITE_DATA signal and a DMA_READ_DATA signal.

Figure 11:
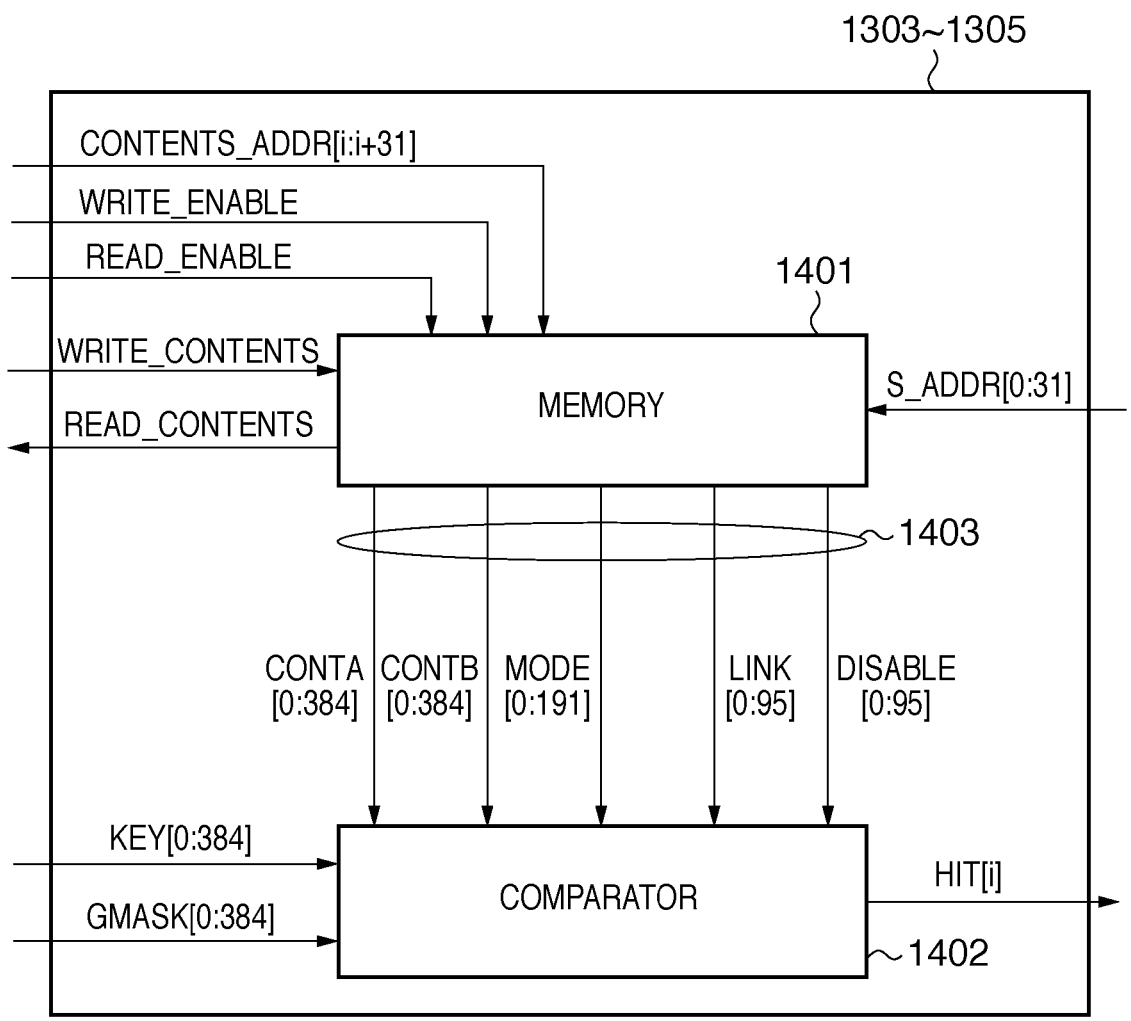
FIG. 11 is a block diagram for explaining a search block according to the embodiment in detail.
Figure 12A:
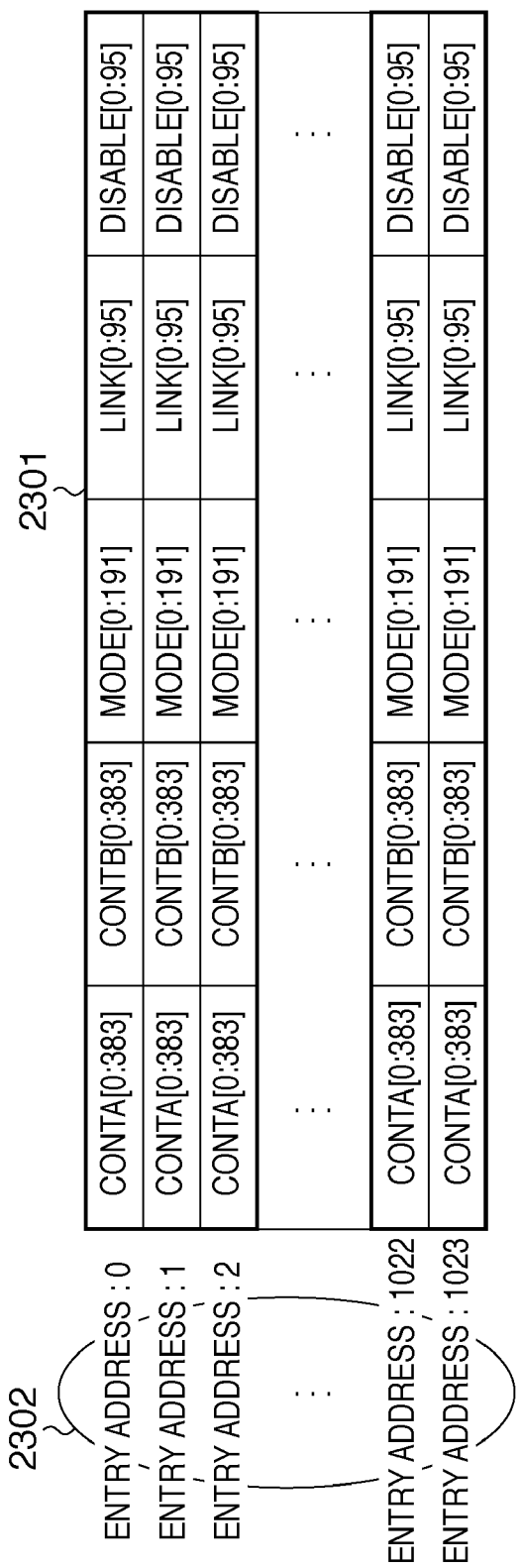
FIG. 12A is a view showing the structure of a search table according to the embodiment.

In this embodiment, the search unit 502 includes 32 search blocks, that is, search block_1 to search block_32 denoted by reference numerals 1303 to 1305, which perform a search. The internal arrangements of search block_1 to the search block_32 denoted by reference numerals 1303 to 1305 are identical and FIG. 11 schematically shows them. A memory 1401 incorporated in each search block includes a plurality of memories, and the total bit width of the memory 1401 is 1152 bits. By totalizing all the memories 1401 incorporated in search blocks, those memories 1401 can be considered as a memory having 1152-bit word×1024 addresses. The search table 501 serves as this memory in this embodiment, and its concept is shown in FIG. 12A.

Figure 12B:
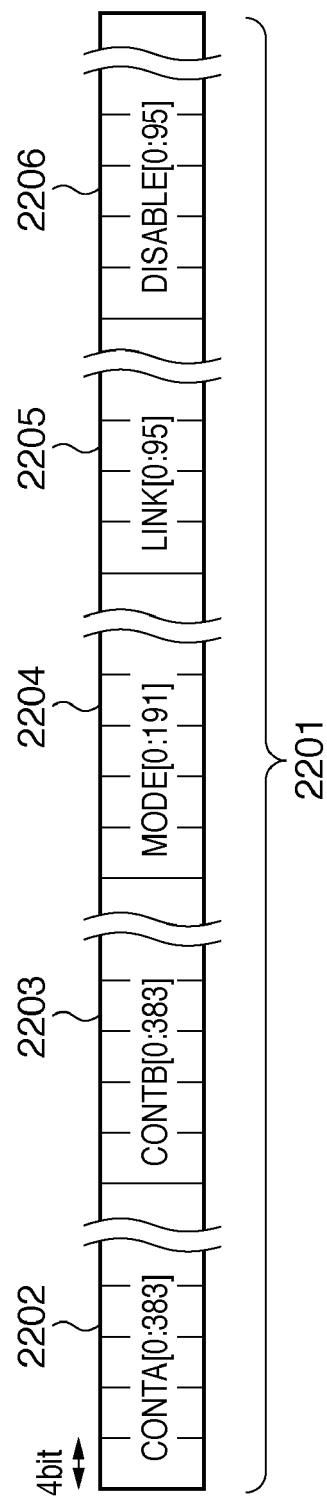
FIG. 12B is a view showing the breakdown of a 1152-bit word.

The breakdown of a 1152-bit word is shown in FIG. 12B. In this embodiment, a 1152-bit word at an arbitrary entry address is formed by 96 regions each having 4 bits. Note that data 2201 as a 1152-bit word will be referred to as entry registration data hereinafter.

In this embodiment, a search mode includes a match search (search mode=00) and a mismatch search (search mode=01) which respectively determine a match and mismatch by bit-by-bit comparison. Furthermore, a range search (search mode=10) and an out-of-range search (search mode=11) are prepared for determining for each region or each connected region formed by connecting a plurality of neighboring regions whether a corresponding region falls between a preset upper limit and lower limit. That is, a search mode is set in accordance with MODE[0:191] data 2204 for each region or each connected region. Connection of neighboring regions is set based on LINK[0:95] data 2205. The LINK[0:95] data 2205 designates the connection states of 96 regions. In the data 2205, a value 1 indicates separation from a succeeding region; and a value 0, connection with a succeeding region. Furthermore, unused regions are set based on DISABLE[0:95] data 2206.

The roles of a CONTA 2202 and CONTB 2203 vary depending on the search mode. In the case of a match search, similarly to the operation of a standard ternary CAM, the CONTA 2202 stores data to be compared, and the CONTB 2203 stores "Don't Care" bits used in the ternary CAM. In the case of a mismatch search, the CONTA 2202 stores data to be compared, and the CONTB 2203 stores "Don't Care" bits. In the case of a range search or out-of-range search, the CONTA 2202 stores an upper limit of a range and the CONTB 2203 stores a lower limit of the range.

In this embodiment, the socket number of the acknowledgement is to undergo a match search. The acknowledgement number (sequence number) is to undergo a range search. Furthermore, in this embodiment, for each transmission segment, the socket number, start sequence number, and last sequence number of a corresponding transmission segment are registered in the search table 501. The socket number and last sequence number (sequence number B) are registered in the CONTA 2202, and the start sequence number (sequence number A) is registered in the CONTB 2203. The LINK data 2205 connects the socket number in the CONTA 2202, the sequence number B in the CONTA 2202, and the sequence number A in the CONTB. The MODE data 2204 designates that the socket number in the CONTA 2202 is to be compared in a match search, and designates that the sequence number B in the CONTA 2202 is a lower limit in a range search, and the sequence number A in the CONTB is an upper limit of it.

The internal operation of the search unit 502 in registration will be explained. For registration processing, the descriptor 1801 formed from data to be registered in the search table 501, a command, and the like is prepared in the external memory 1307 (shared memory 213). Registration is done by writing the start address of the descriptor 1801 in the FIFO 1310. The interface unit 1302 reads out the start address of the descriptor 1801 which has been written in the FIFO 1310. After that, the interface unit 1302 activates the internal DMAC 1309 to load the descriptor 1801 stored in the external memory 1307 into a buffer within the interface unit 1302. After analyzing the command and recognizing that the command is a registration command, the interface unit 1302 reactivates the DMAC 1309 to load the registration data from the external memory 1307.

A value written in an entry address field 1803 is output as CONTENTS_ADDR[0:1023] signals to the memories 1401 of the search blocks. The memory 1401 of a corresponding search block is selected, and the registration data loaded by the DMAC 1309 is transmitted by a WRITE_CONTENTS signal, and is written in the memory 1401 by a WRITE_ENABLE signal.

Upon determining that the received descriptor is a search command, the interface unit 1302 activates the DMAC 1309 to read out the search data 2001 stored in the external memory 1307. The DMAC 1309 transmits the search data 2001 to a comparator 1402 of each of the search blocks 1303 to 1305 through a KEY[0:383] signal and a GMASK[0:383] signal. Then, the interface unit 1302 instructs, by using a START signal, a control unit 1306 to start a search. Upon start of the search, the control unit 1306 outputs an address to the memory 1401 of each of the search blocks 1303 to 1305 using an S_ADDR signal. The address is output as 32 entry addresses, that is, address 0 to address 31, of the memory 1401 of each of the search blocks 1303 to 1305, while being incremented by one for each operation clock. With this memory access, all data registered in the search table 501 are sequentially read out for each operation clock, and are transmitted to the comparator 1402.

Figure 13:
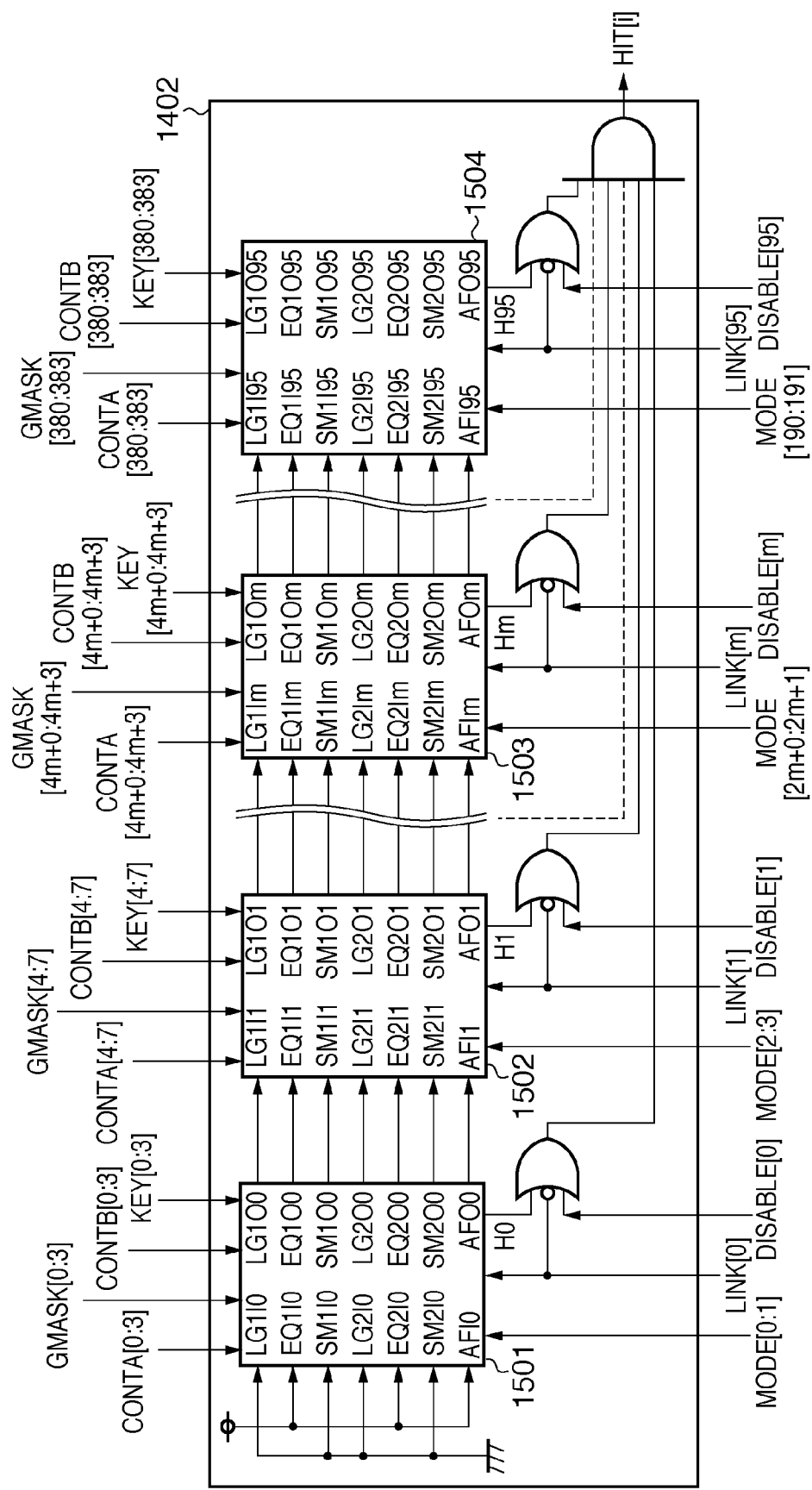
FIG. 13 is a diagram for explaining a comparator according to the embodiment in detail.

FIG. 13 shows details of the comparator 1402.

The comparator 1402 includes 96 comparator core portions denoted by reference numerals 1501 to 1504. In each comparator core portion, CONTA, CONTB, KEY, and GMASK signals each having 4 bits, a MODE signal having 2 bits, and a LINK signal having 1 bit are input. In addition, LG1On, EQ1On, SM1On, LG2On, EQ2On, SM2On, and AFOn signals as carry signals from a comparator core portion of the preceding stage are input to each comparator core portion. Note that n is an integer between 0 and 94. As for the carry input of the comparator core portion 1501 of the first stage, an initial value "0" is given to LG1I0, SM1I0, LG2I0, and SM2I0 signals, and an initial value "1" is given to EQ1I0, EQ2I0, and AFI0 signals. In the signal notation in FIG. 13, "I" for the LG1I0 signal indicates input, and "O" for the LG1O0 signal indicates output. Furthermore, "0" for the LG1I0 signal represents the 0th comparator core portion among the 96 comparator core portions.

FIG. 14 shows the internal arrangement of the mth comparator core portion 1503 as an example. Note that m is an integer between 0 and 95 and the same goes for the following description. The comparator core portion 1503 includes a 4-bit magnitude comparator_1 1601, a 4-bit magnitude comparator_2 1602, a selector 1603, and several logic gates. FIG. 15 shows a truth table associated with input/output signals of the 4-bit magnitude comparator_1 1601. FIG. 16 shows a truth table associated with input/output signals of the 4-bit magnitude comparator_2 1602. These 4-bit magnitude comparators have the same function as a 4-bit magnitude comparator which is generally known.

In addition to CONTB, MODE, GMASK, LINK, and AF signals, LG1, EQ1, and SM1 signals as carry signals output from the 4-bit magnitude comparator_1 1601 and LG2, EQ2, and SM2 signals as carry signals output from the 4-bit magnitude comparator_2 1602 are input to the selector 1603.

The operation of the selector 1603 changes depending on the MODE[2m+0:2m+1] signal (search mode). The search mode includes four modes, that is, a match search (search mode=00), a mismatch search (search mode=01), a range search (search mode=10), and an out-of-range search (search mode=11), as described above. Since the match search and the range search are performed, the operation of the selector 1603 in the match search and the range search will be explained below.

In the match search (search mode=00), the LG2, EQ2, and SM2 signals output from the 4-bit magnitude comparator_2 1602 are not used. In the match search, data transmitted by the CONTB signal has the same meaning as a "Don't Care" bit used in a ternary CAM. The data, therefore, has a structure so that the selector 1603 outputs a DC signal having a value "1" and the CONTB signals serve as mask signals for input signals CA[0] to CA[3] and input signals K[0] to K[3] of the 4-bit magnitude comparator_1 1601. The DC signal is also used in the same way in the mismatch search (search mode=01).

FIG. 17 shows a truth table of input/output signals of the selector 1603 in the match search (search mode=00). Note that the GMASK and KEY signals are input in pairs, and the GMASK signal serves as a mask function for each bit of the KEY signal. That is, if the GMASK signal has a value "1", K signals as input signals of the 4-bit magnitude comparator_1 1601 always have a value "1" regardless of the value of a corresponding KEY signal. CA signals also have a value "1", and corresponding bits are "Don't Care". The determination result is output as an Hm signal. A value "1" of the Hm signal indicates that data matches search conditions, and a value "0" indicates that data does not match the search conditions. In this specification, matching with search conditions may be expressed as being hit or a hit.

In the range search (search mode=10) and the out-of-range search (search mode=11), the CONTB signal has a lower limit of a range. The selector 1603 outputs a value "0" to the DC signal, and stops the functions of the CONTB and GMASK signals which serve as mask signals for each bit in the match search (search mode=00) or the like. In the range search (search mode=10) and the out-of-range search (search mode=11), the upper limit of the range and a search key K[0:3] are compared in the 4-bit magnitude comparator_1 1601, and the lower limit of the range and the search key K[0:3] are compared in the 4-bit magnitude comparator_2 1602. Carry signals including LG1, EQ1, SM1, LG2, EQ2, and SM2 signals as comparison results are input to the selector 1603.

FIG. 18 shows a truth table of the input/output signals of the selector 1603 in the range search (search mode=10).

As shown in the truth table, in the range search (search mode=10), the Hm signal as a determination result is output when the LINK signal input to a comparator core portion has a value "1", that is, when the comparator core portion is on the border of a connected region. Furthermore, if the LINK signal input to a comparator core portion has a value "1" and the GMASK signal has a value 0xF, the selector 1603 outputs a value "1" to the Hm signal regardless of the search key K[0:

3], and indicates that the data matches the search conditions. That is, each connected region can be masked, and "Don't Care" bits can be set.

In this embodiment, in any search mode, a search is completed in 32 clocks since the search is started by the START signal. Search results H0 to H95 output from the comparator core portions 1501 to 1504 during the search are masked by corresponding LINK and DISABLE signals, and are combined into a HIT[i] signal to be input to the control unit 1306. That is, the values of HIT[0:31] signals which have been output from search block_1 to search block_32 denoted by reference numerals 1303 to 1305 for each clock result in a 1024-bit (HIT[0:31]×32) search result (to be referred to as a search result address bitmap hereinafter) corresponding to each of the entry addresses 2202. The DMAC 1309 transfers the search result address bitmap to the external memory 1307, and the start address of the search result address bitmap is displayed on the bitmap address register 1702.

In this embodiment, the socket number of the acknowledgement and (the sequence number −1) are loaded as search keys. If the socket number as a search key matches a socket number and (the sequence number −1) as a search key falls within the range between a lower limit and upper limit of the range search, a determination result indicating that data matches the search conditions is output.

The control unit 1306 counts, from the search result address bitmap, the number of values "1" indicating that data matches search conditions, and transmits, to the interface unit 1302 using a HIT_COUNT[0:9] signal, the total number of the values together with a DONE signal indicating the end of the search. A smallest entry address among hit entry addresses from the search result address bitmap is recorded in the search result address register 1703.

If a single entry address is hit as in this embodiment, a search result address (identical to the identifier 602 in this embodiment) is displayed on the search result address register 1703. Registered time stamp information is acquired by referring to the memory 504 based on the identifier 602 displayed on the search result address register 1703.

Next, RTT measurement processing in the RTT measurement processing unit 409 will be described with reference to FIGS. 19 to 21. In this embodiment, a case in which end (communication apparatus) A transmits TCP segments to partner end (another communication apparatus) B to measure a round trip time until end A receives an acknowledgement segment will be described as an example.

Figure 19:
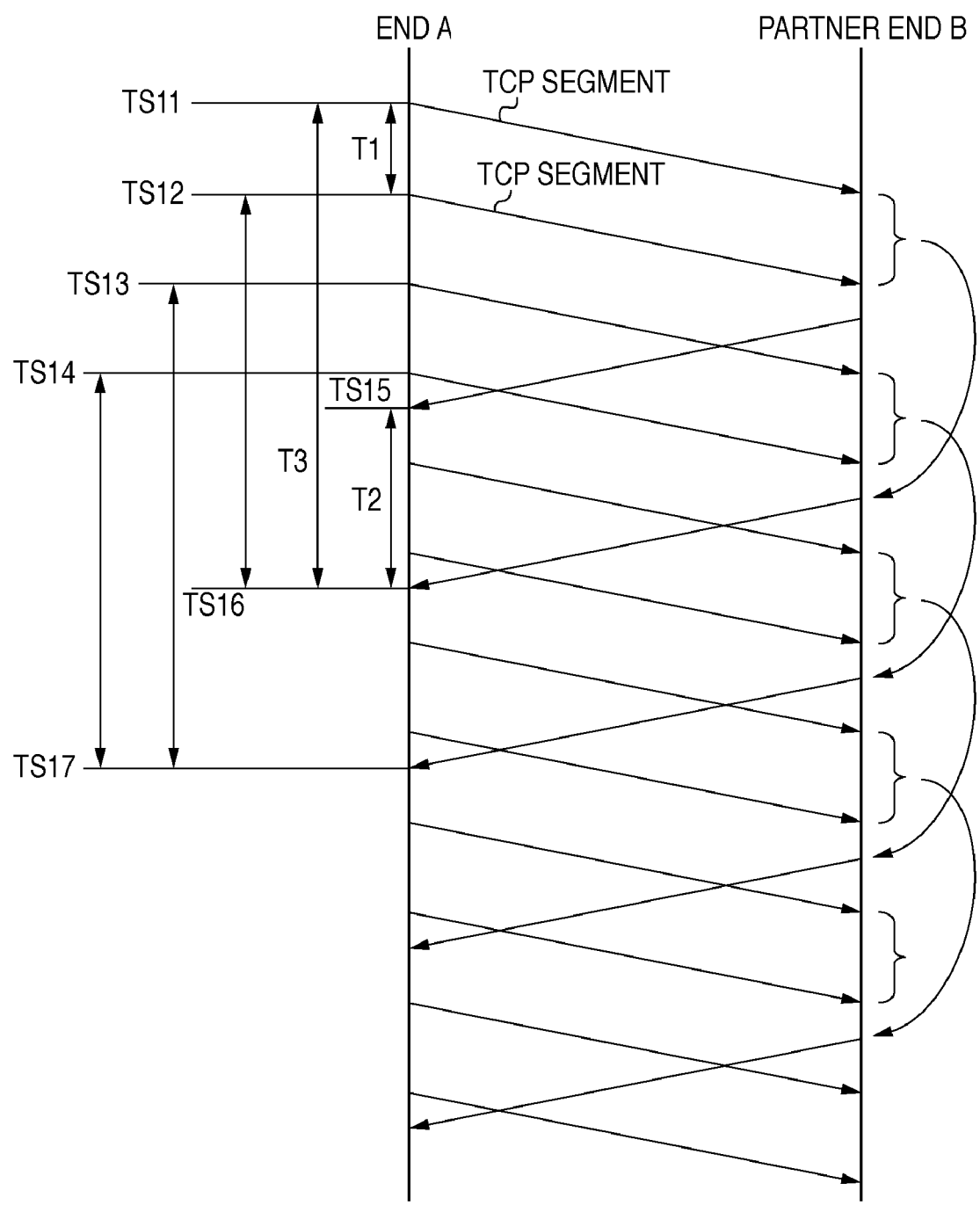
FIG. 19 is a view showing time lines for explaining a method of measuring a round trip time according to the embodiment.

FIG. 19 is a view showing time lines for explaining a method of measuring a round trip time according to the embodiment. Referring to FIG. 19, end A on the left side transmits TCP segments, and partner end B on the right side receives the TCP segments. A round trip time from when end A on the left side transmits a TCP segment until it receives a corresponding acknowledgement segment from partner end B on the right side is measured. Assume that time elapses downward in FIG. 19.

In this example, a delayed acknowledgement mechanism adopted by many devices is used, and partner end B is configured to receive two TCP segments and return an acknowledgement. That is, partner end B receives two TCP segments, executes acknowledgement processing on these TCP segments, and returns an acknowledgement segment.

Note that end A on the left side starts measurement each time it transmits a segment. For the sake of simplification, FIG. 19 shows measurement points TS11 to TS14. Measurement may be started at other segment transmission points. Upon receiving a corresponding acknowledgement segment from partner end B, end A terminates the round trip time measurement. That is, if end A starts measurement at the measurement point TS11, it ends the round trip time measurement upon receiving an acknowledgement segment from partner end B at a timing TS16.

This makes it possible to precisely measure a processing time T1 taken for end A to transmit a segment, a processing time T2 taken for partner end B to execute acknowledgement processing, and a time T (=T3−T1−T2) spent on a transmission channel. If end A starts measurement at another measurement point TS13, it is also possible to precisely measure the times in the same way as the case of the point TS11 described above.

Processing at the start of the above-described round trip time measurement will now be described. This processing is started upon transmitting a segment. In this embodiment, the sub-processors C to E 203 to 205 give a measurement instruction. As for start of measurement, however, the data path control unit 217 notifies the timer control unit 401 of start of transmission of the segment, and the RTT measurement processing unit 409 which has received an instruction from the timer control unit 401 starts the measurement.

First, the RTT measurement control sequencer 503 registers connection information and data information in the search table 501. The connection information includes the socket number 603 of the start information 601. The data information includes the sequence number A 604 and sequence number B 605. The connection information and data information are identified by the identifier 602 in the search table 501. Next, the RTT measurement control sequencer 503 registers, in the memory 504, the time stamp 702 and size 703 at the transmission timing as well as the identifier 602 and socket number 603 to associate with the start information 601 registered in the search table 501.

Processing at the end of the above-described round trip time measurement will now be explained with reference to FIG. 20. This timing corresponds to the timing TS16 (a timing when end A receives the acknowledgement segment from partner end B, and terminates the round trip time measurement) shown in FIG. 19.

Figure 20:
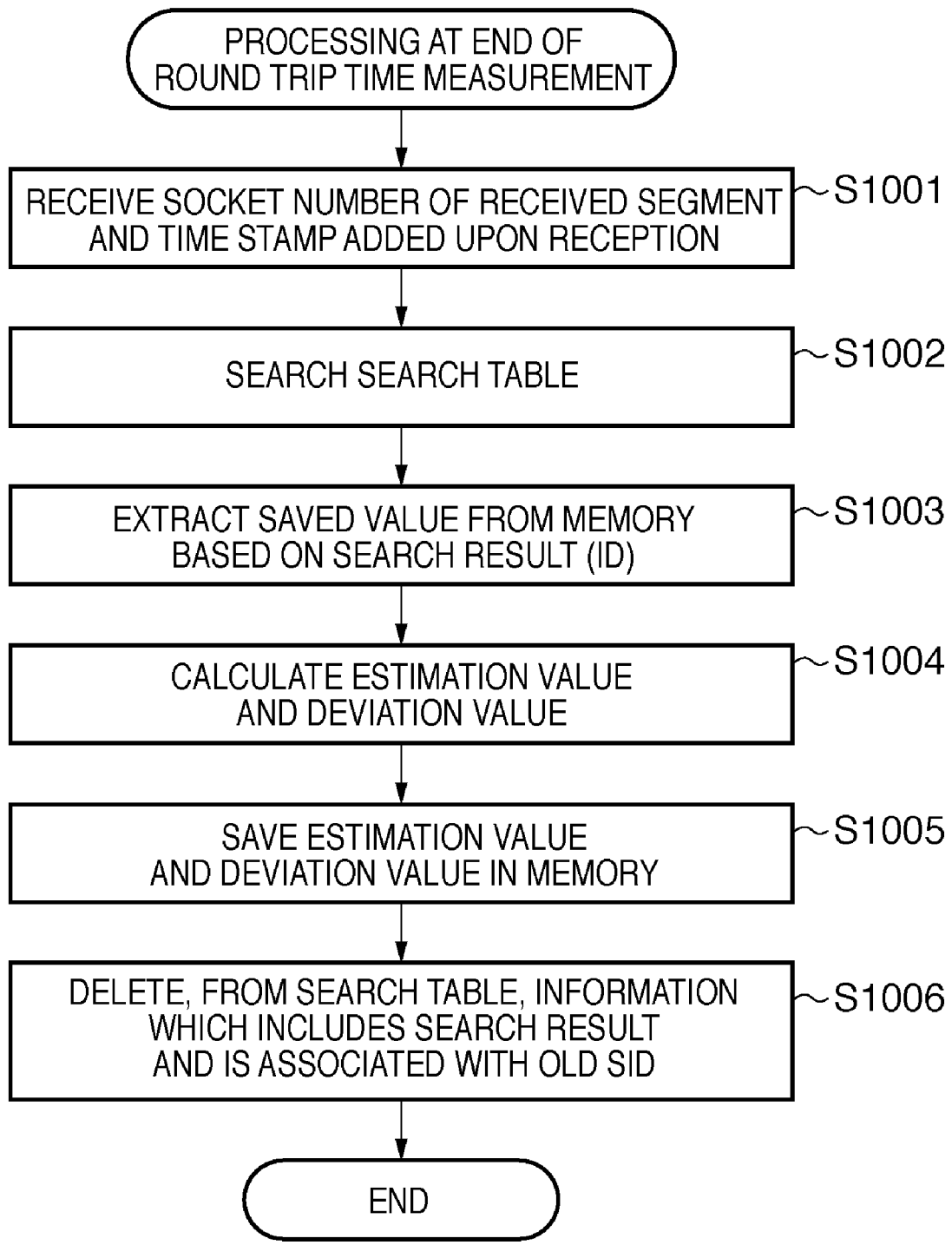
FIG. 20 is a flowchart showing processing at the end of round trip time measurement according to the embodiment.

FIG. 20 is a flowchart showing the processing at the end of the round trip time measurement according to the embodiment. In step S1001, the RTT measurement control sequencer 503 receives time stamp information at the time of reception of the acknowledgement segment, a sequence number, and a socket number from the sub-processor B 202.

In step S1002, the RTT measurement control sequencer 503 gives, to the search unit 502 as search keys, the socket number and a value obtained by subtracting one from the sequence number of the received acknowledgement segment, and instructs the search unit 502 to search the search table 501 by the above-described search conditions. The reason why one is subtracted from the acknowledgement number is that the acknowledgement sequence number is obtained by adding one to the last sequence number of the transmission segment. In step S1003, based on the identifier 602 as a search result, the RTT measurement control sequencer 503 extracts, from the memory 504, the time stamp 702 which has registered at the start of the round trip time measurement.

In the example shown in FIG. 19, the sequence number of the acknowledgement returned at the timing TS16 is obtained by adding one to the last sequence number of the transmission segment transmitted at the timing TS12. As a result of the search, therefore, the identifier registered at the timing TS12 is attained. Depending on the reception state on the reception side, however, the sequence number of the acknowledgement returned at the timing TS16 may be different from the value obtained by adding one to the last sequence number of the transmission segment transmitted at the timing TS12. This is the reason why the range search is performed in this embodiment.

Note that although registration information at the timing TS11 earlier than the timing TS12 remains, registration information at the timing TS12 is searched because of the delayed acknowledgement mechanism. When there exists valid information older than the search result like this example, it can be considered to have an effect of the delayed acknowledgement mechanism. It is possible to predict the actual state of the delayed acknowledgement mechanism adopted by partner end B by counting the total size of the information and the number of segments.

In step S1004, the sequencer 503 calculates estimation values and deviation values from the above-described time stamp information. In this embodiment, the sequencer 503 calculates the estimation values and deviation values according to:

$$DIF\_A = RTTovs\_A - RTTpre\_A$$

$$DIF\_B = RTTovs\_B - RTTpre\_B$$

$$DIF\_C = RTTovs\_C - RTTpre\_C$$

$$RTT\_A = RTTpre\_A + g1 \times DIF\_A$$

$$RTT\_B = RTTpre\_B + g2 \times DIF\_B$$

$$RTT\_C = RTTpre\_C + g3 \times DIF\_C$$

$$DEV\_A = RTTpre\_A + h1(|DIF\_A| - DEVpre\_A)$$

$$DEV\_B = RTTpre\_B + h2(|DIF\_B| - DEVpre\_B)$$

$$DEV\_C = RTTpre\_C + h3(|DIF\_C| - DEVpre\_C) \quad (2)$$

where RTTovs is the measured round trip time, RTTpre is the round trip time estimation value, DIF is the difference between the round trip time estimation value and the measured round trip time, and DEVpre is the deviation from the round trip time estimation value.

Suffixes _A to _C on the labels indicate that the labels are associated with a transmission processing time of end A, an acknowledgement processing time of partner end B, and an elapsed time on a transmission channel, respectively. Furthermore, the sequencer 503 calculates a round trip time RTTpre_u for a unit size and a deviation value DEVpre_u for a unit size based on data sizes associated with the processes.

Note that g1 satisfies ($0 \leq g1 \leq 1$); g2, ($0 \leq g2 \leq 1$); and g3, ($0 \leq g3 \leq 1$). Note also that h1 meets ($0 \leq h1 \leq 1$); h2, ($0 \leq h2 \leq 1$); and h3, ($0 \leq h3 \leq 1$).

In step S1005, the sequencer 503 saves the above-described calculated values in the memory 504 in the form shown in FIG. 7. The sequencer 503 also records, in a work area of the memory 504, intermediate results of the calculation to be used in succeeding processing. In step S1006, the sequencer 503 deletes, from the search table 501 and memory 504, a previous identifier 602 and associated information including the search result. As a method of registering and deleting information, a method of turning on/off a flag which indicates a valid/invalid state and is provided for each piece of information may be used.

Processing of calculating and setting a time-out time will now be described with reference to FIG. 21. Note that this processing is executed at a transmission timing of a segment, for example, at timings TS11 to TS14 shown in FIG. 19. FIG. 21 is a flowchart showing the processing of calculating and setting a time-out time according to the embodiment.

In step S1101, the RTT measurement control sequencer 503 receives a transmission timing and a transmission size from the sub-processor C 203. In step S1102, the sequencer 503 acquires a transmission size difference and an acknowledgement sequence number difference. The sequencer 503 then calculates an estimation value and deviation value by respectively multiplying a size with a round trip time for a unit size and a deviation value for a unit size. As the values used at this time, the latest values which have been saved in the memory 504 (FIG. 7) in step S1005 are used.

Letting RTTpre_u be the round trip time for the unit size, S be the size processed during the round trip time, and DEVpre_u be the deviation value for the unit size, the estimation value RTTpre and the deviation value DEVpre can be calculated by:

$$RTTpre = RTTpre\_u \times S$$

$$DEVpre = DEVpre\_u \times S \quad (3)$$

In step S1103, the sequencer 503 calculates a time-out time RTO using:

$$\begin{aligned}
RTO &= (RTT\_A + RTT\_B + RTT\_C) + \\
&\quad 4(DEV\_A + DEV\_B + DEV\_C) \\
&= RTTpre\_A + RTTpre\_B + RTTpre\_C + \\
&\quad g1(RTTovs\_A - RTTpre\_A) + \\
&\quad g2(RTTovs\_B - RTTpre\_B) + \\
&\quad g3(RTTovs\_C - RTTpre\_C) + \\
&\quad 4(RTTpre\_A + RTTpre\_B + RTTpre\_C) + \\
&\quad 4 \times h1|RTTovs\_A - RTTpre\_A| + \\
&\quad 4 \times h2|RTTovs\_B - RTTpre\_B| + \\
&\quad 4 \times h3|RTTovs\_C - RTTpre\_C| - \\
&\quad (4 \times h1 \times DEVpre\_A + 4 \times h2 \times \\
&\quad DEVpre\_B + 4 \times h3 \times DEVpre\_C)
\end{aligned} \quad (4)$$

Note that g1 satisfies ($0 \leq g1 \leq 1$); g2, ($0 \leq g2 \leq 1$); g3, ($0 \leq g3 \leq 1$); h1, ($0 \leq h1 \leq 1$); h2, ($0 \leq h2 \leq 1$); and h3, ($0 \leq h3 \leq 1$). Note also that since some terms in above equation (4) are calculated in step S1004, it is possible to use, in step S1005, the values recorded in the work area of the memory 504.

In step S1104, the RTT measurement control sequencer 503 registers the calculated time-out time RTO in the initial value memory 406.

The above-described processing is individually executed for each connection. A socket number for identifying a connection, therefore, plays an important role. For example, in the search in step S1002, a socket number is used as a search key. The time-out time RTO registered in the initial value memory 406 is associated with the socket number.

For descriptive convenience, FIG. 19 only shows segment transmission/reception in the same connection. Since the above-described processing is individually executed for each connection, the same goes for a case in which segment transmission/reception is performed in a plurality of connections.

Even in a state in which segment transmission/reception is executed in a plurality of connections, the start information 601 and the information 701 are registered in the search table 501 and the memory 504 for each connection. These pieces of information, for example, are registered at each of the measurement start points TS11 to TS14 shown in FIG. 19. As a calculation result after an acknowledgement is received and a round trip time is measured, one pair of the pieces of information may be acquired for each connection.

According to the embodiment, it is possible to efficiently extract desired information for each connection from a plurality of pieces of registered start information.

It is also possible to precisely measure a processing time taken for an end to transmit a segment (T1 shown in FIG. 19), a processing time taken for a partner end to execute acknowledgement processing (T2 shown in FIG. 19), and a time spent on a transmission channel (a time obtained by subtracting T1 and T2 from T3 shown in FIG. 19). The detailed round trip time allows to accurately grasp the state of the transmission channel and the load state of the opposing end. It is possible to efficiently manage various sequence controls held by TCP by utilizing the measurement results. Furthermore, it is possible to provide useful information for various protocols managing QoS.

According to the above-described embodiment, multiplexing round trip time measurement allows to minimize the load of resource management and overhead. This also significantly shortens a measurement interval as a whole, thereby enabling measurement with high accuracy. By appropriately managing a time-out time to increase efficiency, and implementing QoS at the protocol level based on accurate information, it is possible to improve the system performance as a whole.

The object of the present invention is also achieved when a recording medium which records software program codes for implementing the functions of the above-described embodiment is supplied to a system or apparatus, and the computer (or the CPU or MPU) of the system or apparatus reads out and executes the program codes stored in the recording medium.

In this case, the program codes read out from the computer-readable recording medium implement the functions of the above-described embodiment, and the recording medium which stores the program codes constitutes the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171232, filed Jun. 30, 2008, which is hereby incorporated by reference herein in its entirety.

What is claimed is:

1. A communication apparatus which transmits data to a transmission destination, and receives, from the transmission destination, an acknowledgement indicating that the data has been received, comprising:
   a memory unit configured to store first specific data for specifying a plurality of transmission data, and transmission time data indicating transmission times of the plurality of transmission data;
   a search unit that searches, based on second specific data contained in the acknowledgement, said memory unit for the first specific data for specifying transmission data corresponding to the acknowledgement; and
   a unit that calculates a round trip time based on a transmission time of the transmission data specified by the first specific data found by said search unit, and a reception time at which the acknowledgement is received.

2. The apparatus according to claim 1, wherein the first specific data indicates start data and end data of the transmission data, and said search unit performs, based on the second specific data, a range search within a range between the start data and the end data indicated by the first specific data.

3. The apparatus according to claim 1, wherein every time data is transmitted, said memory unit stores first specific data for specifying the transmitted data, and transmission time data indicating a transmission time.

4. A method of calculating a round trip time in a communication apparatus which transmits data to a transmission destination, and receives, from the transmission destination, an acknowledgement indicating that the data has been received, the method comprising:
   storing, in a memory, first specific data for specifying a plurality of transmission data, and transmission time data indicating transmission times of the plurality of transmission data;
   searching, based on second specific data contained in the acknowledgement, the memory for the first specific data for specifying transmission data corresponding to the acknowledgement; and
   calculating a round trip time based on a transmission time of the transmission data specified by the found first specific data, and a reception time at which the acknowledgement is received.

5. The method according to claim 4, wherein the first specific data indicates start data and end data of the transmission data, and a range search within a range between the start data and the end data indicated by the first specific data is performed based on the second specific data.

6. The method according to claim 4, wherein every time data is transmitted, first specific data for specifying the transmitted data, and transmission time data indicating a transmission time are stored in the memory.

7. A non-transitory storage medium storing a computer program for transmitting data to a transmission destination, receiving, from the transmission destination, an acknowledgement indicating that the data has been received, and calculating a round trip time, the program comprising:
   a code for storing, in a memory, first specific data for specifying a plurality of transmission data, and transmission time data indicating transmission times of the plurality of transmission data;
   a code for searching, based on second specific data contained in the acknowledgement, the memory for the first specific data for specifying transmission data corresponding to the acknowledgement; and
   a code for calculating a round trip time based on a transmission time of the transmission data specified by the found first specific data, and a reception time at which the acknowledgement is received.

* * * * *